United States Patent [19]

Ladewski

[11] Patent Number: 5,517,575
[45] Date of Patent: May 14, 1996

[54] METHODS OF CORRECTING OPTICALLY GENERATED ERRORS IN AN ELECTRO-OPTICAL GAUGING SYSTEM

[76] Inventor: Theodore B. Ladewski, 305 Wesley, Ann Arbor, Mich. 48103

[21] Appl. No.: 136,624

[22] Filed: Oct. 13, 1993

Related U.S. Application Data

[63] Continuation-in-part of Ser. No. 770,885, Oct. 4, 1991, Pat. No. 5,284,267.

[51] Int. Cl.⁶ ........................................... G06K 9/00
[52] U.S. Cl. .................. 382/108; 382/309; 356/371; 356/394
[58] Field of Search ........................ 382/50, 57, 108, 382/309; 356/394, 371

[56] References Cited

U.S. PATENT DOCUMENTS

| | | | |
|---|---|---|---|
| 171,838 | 1/1876 | Munnich | 356/441 |
| 2,250,521 | 7/1941 | Boeder | 273/141 R |
| 2,438,743 | 3/1948 | Feinbloom | 351/160 R |
| 2,645,971 | 7/1953 | Herbst | 356/376 |
| 2,693,735 | 11/1954 | Zehender | 356/371 |
| 2,695,544 | 11/1954 | Brenner | 356/371 |
| 3,891,320 | 6/1975 | Kimura et al. | 356/371 |
| 4,049,350 | 9/1977 | Brück | 356/239 |
| 4,290,698 | 9/1981 | Milana | 356/371 |
| 4,505,585 | 3/1985 | Yoshikawa et al. | 356/237 |
| 4,771,267 | 9/1988 | Russell, Jr. et al. | 382/50 |
| 4,878,114 | 10/1989 | Huynh et al. | 358/106 |
| 4,929,846 | 5/1990 | Mansour | 250/571 |
| 4,960,999 | 10/1990 | McKean et al. | 250/461.1 |

FOREIGN PATENT DOCUMENTS 500892  3/1939  United Kingdom .

*Primary Examiner*—Leo H. Boudreau
*Assistant Examiner*—Chris Kelley
*Attorney, Agent, or Firm*—Dykema Gossett

[57] ABSTRACT

Methods of correcting optically generated errors in images formed of test object surface profiles include the use of a bias image to correct errors resulting from problems associated with components of the gauging system. The bias image is also useful for correcting errors resulting from the nature of the test object surface. Further methods also include the use of a mask to selectively vary the amount of radiation that is used across the test object surface when gauging the surface profile. The mask effectively uniformly irradiates the test object surface to correct errors caused by irregular or extreme surface contours or coloration in the test object surface.

2 Claims, 17 Drawing Sheets

METHODS OF CORRECTING OPTICALLY GENERATED ERRORS IN AN ELECTRO-OPTICAL GAUGING SYSTEM

This application is a continuation-in-part of the application having Ser. No. 07/770,885, filed Oct. 4, 1991, now U.S. Pat. No. 5,289,267.

The present invention is generally related to a system for determining the trueness of an object from a predetermined geometry. More specifically, this invention is related to a highly automated, electro-optical system for gauging deviations of a surface profile of a test object from a predetermined nominal profile geometry and a method for gauging deviations of such surface profiles. The methods and apparatus of this invention are suitable for use with test objects having a variety of surfaces.

BACKGROUND OF THE INVENTION

It has been proposed to estimate the flatness of a surface on a test object by visually observing reflection through a dye liquid film or layer placed between the test surface and a flat master surface. For example, U.S. Pat. No. 2,695,544 discloses a system consisting of, in order, a pane of glass, a dye layer, and the test object. Light is directed through the pane of glass and into the dye layer. The operator then visually observes the light reflected by the test object surface back through the dye layer and the glass pane. Since the light energy is attenuated as a function of distance traveled through the dye layer, departure of the reflected light from uniform intensity across the image generally indicates a corresponding departure of the test object surface from flatness or parallelism with the surface of the glass pane. This method is limited to a subjective and qualitative estimate of the flatness of the test object. This method is also limited by the visual acuity of the operator which will, of course, vary from operator to operator. This method cannot account for differences in reflectivity of the test object across its surface or for differences in the illumination or for other artifacts. This method is suitable for use only in relatively less-demanding quality control applications where parts are either accepted or rejected depending on their qualitative deviation from a prescribed geometry. This method is generally not suitable for use in the operation, control, and/or modification of a manufacturing process wherein the parts are produced. This method is generally not useful in quality control or other operations where it is necessary to quantitatively determine the deviations of the test object from a prescribed geometry.

It is desirable, therefore, to provide a system and a method for gauging the deviations of a test object from a predetermined nominal profile geometry with enhanced and improved capabilities for precise quantitative measurement of surface deviations over the entire surface of the test object. It is also desirable to provide a system and a method for gauging the deviations of a test object from a predetermined nominal profile geometry with improved measurement resolution that is adapted for use in conjunction with test objects having a wide variety of geometries and optical characteristics. It is also desirable to provide such a system and method that includes a calibration means for correcting optically generated errors and for compensating against effects of background radiation, variations in illumination intensity, and variations in test object reflectivity. It is also desirable to provide such a system and method that allows for improved control of measurement resolution, and that is readily adapted for automation. The preferred embodiment of this invention provides an improved system and method for gauging test object surface geometry which achieves these just described objectives and criteria by detecting the infrared radiation naturally emitted from the test object.

SUMMARY OF THE INVENTION

The methods associated with the presently preferred embodiments of this invention are for correcting optically generated errors in the image of a test object surface profile that is formed by an optical gauging system designed in accordance with the teachings of this invention. The presently preferred methods of correcting optically generated errors in such a system include filtering the radiation that is used to irradiate a test object before such radiation is incident upon the test object. A bias image is formed of the test object surface profile and such a bias image is used to correct the optically generated errors present in the image that is otherwise generated of the test object surface profile.

Another method that is presently preferred for correcting optically generated errors in a test object surface profile image includes the filtering step described above and the creation of a bias image. Further, the amount of radiation that irradiates the test object surface is selectively varied across the surface of the test object in order to accommodate for varying reflectance or extreme differences or changes within the surface profile of the test object. One embodiment for varying the amount of radiation that irradiates the test object includes using a photographic slide which is essentially a negative of an image that is otherwise produced of the test object surface. The photographic slide is used in a projection system which mimics a typical slide projector system. Alternatively, an obstruction is placed within the path of the radiation as it travels toward the test object in order to selectively vary the amount of radiation that illuminates the test object surface.

One embodiment of the inventive system for gauging deviations of a surface on a test object from a preselected nominal surface geometry includes a reference surface that is essentially transparent to the electromagnetic radiation used. The reference surface may be substantially a matched or mated surface to the preselected nominal surface geometry of the test object. The terms "matched surface" or "mated surface" as employed in the present application mean that the reference or master surface essentially contains the complement image of the prescribed nominal surface geometry which is the desired profile of the test object such that, when the master surface and the test object are brought into adjacent opposition as shown in FIG. 2, the separation between the master surface and the test object will be essentially uniform across the surfaces. For example, if the nominal surface geometry of the test object is flat, the master surface of the reference surface is likewise flat. If the nominal surface of the test object is of convex curved shape, the master surface of the reference surface is of complementary concave curved shape. An essentially non-scattering or low-scattering attenuating medium is placed between the test surface and the master surface, with the test surface opposed to the master surface. The attenuating medium may be a dye fluid or any appropriate medium (fluid, powder, or gas) providing that the medium attenuates the electromagnetic radiation with minimal scattering, and that the medium freely flows into and substantially fills the voids between the master surface and the test surface. The test object may be immersed in the attenuating fluid (such as a dye fluid). The attenuating medium preferably substantially fills the spaces to be gauged between the master surface and the test surface.

A source of electromagnetic radiation is positioned to direct such radiation through the reference surface and into the dye fluid. The radiation, preferably in the visible light spectrum, is directed into the dye fluid through the support and master surface. An image recording system is positioned to receive the radiation reflected off the test object and back through the dye fluid and thereby record an image of electromagnetic radiation transmitted from the dye fluid. The intensity of the radiation across the image will vary as a function of the deviations of the test object surface from the nominal geometry. The image received by the image recording system is digitized to form a series of digital signals indicative of intensity of radiation received at sequential picture elements or pixels of the image. An electronic memory receives, stores, and manipulates such digital signals as necessary.

The present invention uses the attenuation of electromagnetic radiation passing through a medium to determine and measure the deviations of a test object from that of the nominal and desired profile geometry. In the case of visible light passing through a dye layer, the light energy is attenuated exponentially as a function of the distance traveled through the dye layer. The measured deviations of the reflected light from uniform intensity (i.e., the variations in intensity of the reflected light across the surface) can be used to calculate the relative deviations of the test object surface from the master surface. Calibration means and methods allow the absolute deviations of the test object surface from the master surface to be determined.

Implementation of the present invention provides a two-dimensional image of the test object surface profile in a form suitable for digital manipulation, processing, and analysis within a computer system using appropriate software techniques. The digital image of the test object surface profile or digital data corresponding to the test object surface profile may be readily displayed or plotted in the form of a two-dimensional image illustrating the deviation profile or, with proper computer enhancement, displayed or plotted in the form of a three-dimensional image illustrating the deviation profile. Cross-sectional views of the deviation profile can readily be obtained through critical surface areas of the test object. The digital image may also be employed using conventional manufacturing process control techniques to automatically correct a part production process, to reduce or eliminate profile deviations in the test object or to correct for variations over time in the part production process due, for example, to wear or variations in the cutting process or tooling members. Digital processing and software techniques may be employed to correct for non-uniform illumination of the test object, distortion and/or gain variations in the imaging camera, non-uniformities in surface reflectivity of the test object, variations in dye characteristics across the image, and other artifacts.

The present invention can be utilized for measuring deviations of surface profiles from a reference profile master under a variety of conditions. For each condition, a preferred wavelength and attenuating medium can be selected that is based on the costs or other considerations (e.g., desired resolution, tolerances, safety considerations, and the like) relating to the imaging and digitally recording the reflected electromagnetic wave at different wavelengths. For example, to measure deviations on the order of thousandths of an inch, optical frequencies in the visible region and a dye fluid are the presently preferred embodiment of the invention because suitable inexpensive illumination systems and digitizing cameras exist for use in this embodiment. However, if it is desired to measure larger sized surface deviations, microwave radiation might be used as the illuminating radiation with a resistive dielectric fluid as the attenuating medium.

The presently preferred embodiments of this invention provide the ability to gauge any test object surface geometry provided that surface emits a minimum amount of detectable infrared radiation.

These and other objects and features of the present invention will become apparent to one skilled in the art from the following description of the preferred embodiments with reference to the appended drawings, of which the following is a brief description.

DETAILED DESCRIPTION OF THE PREFERRED EMBODIMENTS

Figure 1:
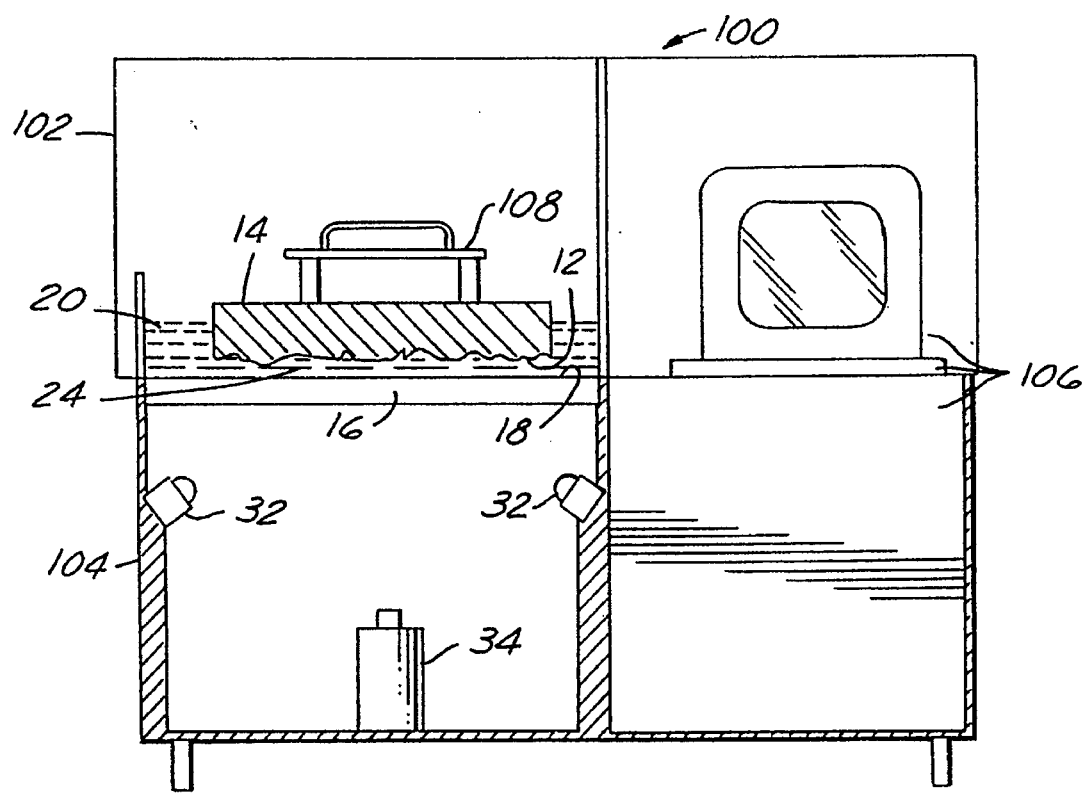
FIG. 1 is a diagram of an inspection station using the gauging system of the present invention.

FIG. 1 generally illustrates one embodiment of this invention that includes an inspection station 100 using the gauging system of the present invention. Inspection station 100 includes a test chamber enclosure 102, an electromagnetic source and image sensor compartment 104, and the associated computer work station 106. The computer work station 106 is shown with a display screen, input device (i.e., a keyboard), and a cabinet to contain the associated computer hardware, memory, and interface devices. The test chamber enclosure 102 contains the test object 14 and test surface 12 which is to be gauged for deviations from a preselected nominal surface geometry. Using fixture 108, the test object 14 is lowered into or placed in an attenuating medium 20 using fixture 108 such that there is a thin film 24 of the attenuating medium 20 between the test object surface 12 and the master surface 18 of the master support 16. The master support 16 must be transparent to the electromagnetic radiation used. The master support 16, in this case an optical flat, provides the interface between the test chamber enclosure 102 and the electromagnetic radiation source and image sensor compartment 104. Compartment 104 contains the electromagnetic source 32 and the image sensor 34. In the embodiment of FIG. 1, two electromagnetic radiation sources 32 are used. One electromagnetic radiation source can be used; or, if desired, more than two electromagnetic radiation sources can also be used. As explained in more detail below, electromagnetic radiation from the electromagnetic radiation source 34 is directed through the master support 16 and its master surface 18, into the attenuating film 24, onto test object surface 12, and then back through the attenuating film 24 and master support 16 to the image sensor 34. The distance the electromagnetic radiation travels through the attenuating film 24 is generally equal to twice the distance between surfaces 12 and 18 at any given point on surface 12. By appropriate manipulation, the electromagnetic image received at image sensor 34 is converted into digital signals suitable for computer manipulation. Using computer and suitable software techniques via the computer work station 106, the deviations of the test object surface 12 from a preselected nominal geometry can be determined and displayed as detailed below.

As one skilled in the art will realize, the components in FIG. 1 can be reoriented in various ways. For example, the test chamber compartment 102 and the electromagnetic radiation source and image senor compartment 104 can be rotated 180 degrees relative to each other such that the test object surface 12 would be located below the electromagnetic radiation source 32 and image sensor 34. Or the compartments 102 and 104 can be arranged side-by-side with the master support 16 being essentially a vertical interface between the two compartments (i.e., the test object 14 is located on one side of the master support 16 and the electromagnetic radiation source 32 and the image sensor 34 on the other side). This side-by-side arrangement may be especially useful to eliminate or minimize air bubbles which might otherwise be trapped between the surfaces 12 and 18.

Figure 2:
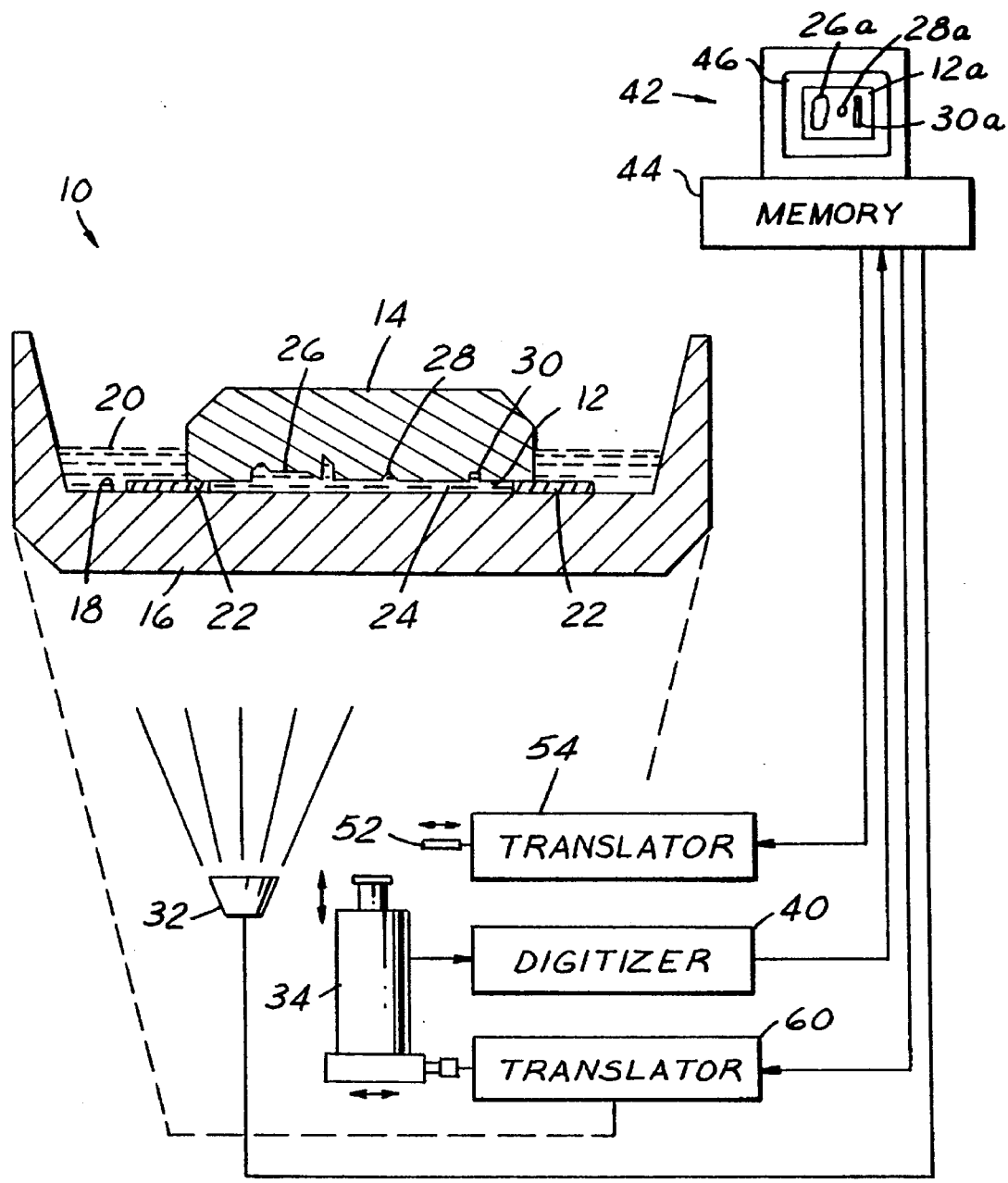
FIG. 2 is a diagrammatic view of a gauging system in accordance with an embodiment of the present invention.

FIG. 2 illustrates a system 10 in accordance with one embodiment of the present invention for gauging or measuring deviations of the surface 12 on a test object 14 from a preselected nominal surface geometry, in this case a flat geometry. System 10 includes a support 16 having a master surface 18 that is manufactured to be a substantially exact mating or matched surface of the nominal surface geometry of the test surface 12 (i.e., a flat surface). As noted above, the terms "matched surface" or "mated surface" as employed in the present application mean that the master surface 18 essentially contains the complement image of the prescribed nominal surface geometry which is the desired profile of the test object. For example, if the prescribed nominal geometry of the test object contains, for example, a bulge in the shape of a pyramid, the master surface will contain a corresponding depression in the shape of a pyramid. Or if the prescribed nominal geometry of the test object is flat, the master surface will be flat. It is not necessary, however, that the master surface conform exactly in every detail to the prescribed nominal surface geometry of the test object. Variations between the master surface and the appropriate complement of prescribed nominal surface geometry can be corrected or accounted using for the calibration methods and apparatus described below.

An attenuating medium 20, in this embodiment a dye liquid, is carried on master surface 18 of support 16. Test object 14 rests on a plurality of shims or spacers 22 that separate master surface 18 from test surface 12 by a nominal distance corresponding to the thickness of the shims. It is generally preferred that shims 22 have the same thickness. In some cases, however, it may be preferred that shims of different thickness are used. Dye liquid 20 thus forms a fluid film or layer 24 between surfaces 12 and 18 and fills the voids and depressions 26, 28, and 30 in surface 12 of test object 14. The distance between the two surfaces 12 and 18 (i.e., the nominal thickness of the attenuating medium 20) preferably is minimized. Generally, a separation distance of about 0.01 to 0.05 inches will be satisfactory. Separations of the two surfaces 12 and 18 substantially greater than or less than these limits may, however, be employed.

The attenuating medium 20 preferably fill any voids, depressions, grooves, and other features to be gauged between the two surfaces 12 and 18. In some instances, they may be imperfections or designed features of the test object which are located in areas of the object that are not critical. If such areas are not to be examined, it is, of course, not necessary that such features be filled with the attenuating medium 20. In many cases, it may be preferred that such areas (i.e., the non-interest areas) be blocked or masked out to simplify analysis, and allow the operator to concentrate on the critical areas of interest. Means for masking such areas can include physical apparatus such as shields placed on the master surface or placed in front of the image sensor to limit the field of vision of the image sensor. Alternatively, means for masking can include software that selectively utilizes only portions of the radiation collected by image sensor 34 such that only selected areas on the test object surface are gauged.

In some instances, air bubbles may become entrapped between the surfaces 12 and 18, especially in pockets 26, depressions 28, or cracks 30 in surface 12 of test object 14. Although it is generally preferred that such air bubbles be minimized, it is not necessary that they be completely eliminated. Such air bubbles can be minimized by appropriate venting channels so that the bubbles can escape, careful orientation of the part as it is placed in the attenuation medium so that entrapment of such bubbles is minimized, vibration of the part or system so that the bubbles can escape, the use of degassed solvents, and the like. As noted above, air bubbles can also be minimized by orienting the compartments 102 and 104 in a side-by-side arrangement with the master support 16 in an essentially vertical orientation.

Figure 3:
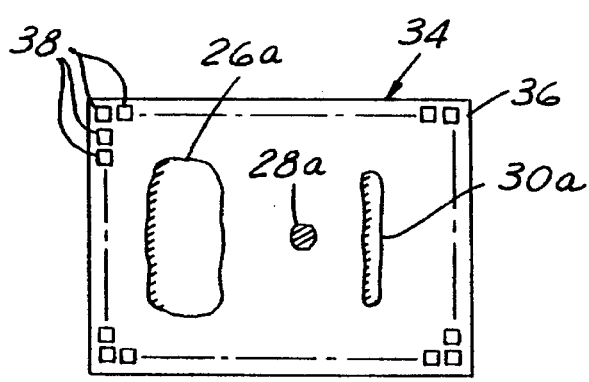
FIG. 3 is a diagrammatic view of the test object surface profile image viewed by the camera in FIG. 2.

An electromagnetic radiation source 32 is positioned beneath support 16 and directs light energy through support 16 into film 24 of dye liquid 20 between surfaces 16 and 18. Support 16 is substantially transparent to such light energy from source 32. Light energy from source 32 is therefore incident on surface 12 of test object 14 through support 16 and film 24, and is reflected by the test object surface back through the dye liquid film 24 and the support 16. An image sensor 34 (e.g., a camera) is positioned adjacent to light source 32, beneath support 16 and oriented relative to support 16 so as to receive the attenuated reflections from the surface 12. Image sensor 34 is preferably responsive in a predictable manner to the electromagnetic radiation used, preferably provides the desired resolution, and is preferably capable of generating data that can be digitized. Suitable image sensors include vidicon cameras, charge coupled devices (CCDs), image array sensors, and the like. As shown in FIG. 3, image sensor 34 preferably comprises a CCD sensor 36 having a matrix of image sensing elements 38 in a row-and-column array. Each element 38 thus receives a corresponding portion or pixel of the overall image of test object surface 12. Cameras with variable focal lengths or zoom lenses are often preferred because they allow the resolution of the system to be varied relatively simply. In some instances, however, cameras with fixed focal lengths may be preferred. For example, a gauging system dedicated to a manufacturing process producing a single part might not need variable resolution capabilities. Cameras capable of interfacing with the computer and, therefore, being controlled by the computer are especially preferred.

Camera 34 is connected through conventional digitizing electronics 40 to a computer 42 that includes digital memory 44 for receiving and storing the digitized pixel signals from camera 34. Image data is thus stored as numeric data indicating the intensity of the electromagnetic radiation received for each pixel in the matrix of pixels thereby describing the radiation intensity across the image. Computer 42 also includes a user screen 46 for displaying the stored image of test object surface 12. The stored image or data can be displayed, with conventional computer manipulation or enhancement, as shades of gray or in various colors to illustrate deviations from the prescribed nominal geometry. The digital data can also be printed or plotted as desired using conventional computer-graphic techniques. The digital data (in either its raw or manipulated forms) can be stored indefinitely to allow for long-term quality control analysis. Such data might be useful, for example, to study failures of critical components where the actual failed components are not readily available (e.g., satellite malfunctions) or to perform long-term statistical analysis of failure or reject rates to pinpoint and correct manufacturing problems.

In operation, light energy from source 32 is incident on surface 12 through support 16 and dye film 24, and reflects off surface 12 back through film 24 and support 16 to camera 34. Such light energy attenuates during two passes through film 24 as a function of distance traveled through the film. Thus, if the film is of uniform thickness, meaning that surfaces 12 and 18 are parallel to each other throughout the image area, the image of test object surface 12 will be of uniform intensity (assuming uniform reflectivity across the surface 12). On the other hand, any pockets 26, depressions 28, or cracks 30 in surface 12 of test object 14 will necessarily increase the distance that the light travels through the dye film, resulting in darker sections 26a, 28a, and 30a in the image 12a of the test object surface as illustrated in FIGS. 2 and 3. In the same way, any outward protrusions in surface 12 of test object 14 (not illustrated in the drawings) will result in a correspondingly reduced distance of light travel through film 24 and correspondingly lighter areas of the test surface image. Intensity variations of the image portions 26a, 28a, and 30a are directly related to the depth of the corresponding surface irregularities, and the area of each image portion corresponds to the area of the corresponding depression in the overall surface. By accounting for system geometry and illumination variations, the transmission properties of support 16 and attenuation properties of fluid 20, the two-dimensional reflected image of test part surface 12 is converted within computer 42 to a digitized two-dimensional map 12a of the test object surface contour. Map regions of interest may be selected and magnified by the operator. By suitably calibrating the system in ways to be described, precise quantitative measurements of surface profile deviations can be obtained for analysis and/or control purposes.

Figure 4:
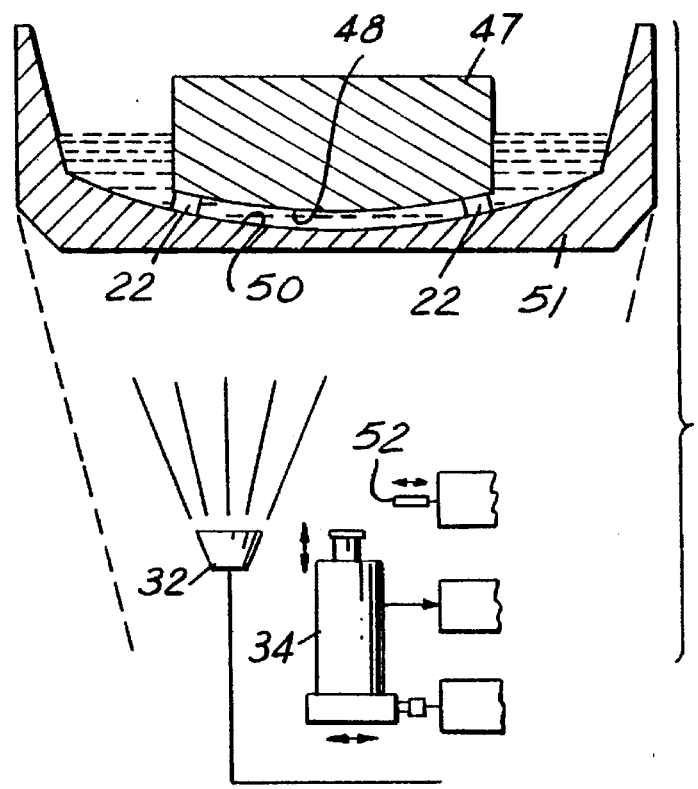
FIG. 4 is a partial diagrammatic view of a modified embodiment of the present invention.

FIG. 4 illustrates a modified embodiment of the invention for gauging the profile of a test object 47 having a curved test surface 48. The master surface 50 of support 51 is either machined as a matched or mated surface 48 of the nominal desired geometry into a glass support using, for example, a diamond lathe or is cast into a slab of suitable transparent material. In this connection, it will be appreciated that, although master surface 50 (FIG. 4) or 18 (FIG. 2) is employed as a reference surface for gauging purposes, the master surface need not be an exact replica of the nominal test object surface geometry. Small deviations in profile between the nominal surface geometry and the master reference surface can be accommodated by suitably calibrating computer 42 with a dye liquid between the master surface and the test object surface (i.e., surfaces 18 and 12 in FIG. 2 and surfaces 50 and 48 in FIG. 4) using a test object predetermined to possess a surface of desired nominal contour. Such a test object (i.e., one known to have or specifically manufactured to have the predetermined nominal surface geometry) may be retained as a "standard" for routine calibration purposes. If the amount of light reflected from all points on the standard test object surface during this calibration operation is uniform throughout, the thickness of the dye film is uniform and no corrections need to be made. On the other hand, any deviations between the master reference surface and the opposing surface of the standard part will result in a corresponding variation in intensity at one or more pixels of the reflected surface image. By measuring and storing these pixel signals at all points across the surface image, computer 42 effectively captures the correct profile of the standard part with respect to each opposing or corresponding point on the master surface. The information so obtained can then be employed to produce a set of correction data that is used to offset or bias the corresponding pixel signal or signals during system operation to accommodate any undesirable defects in the master reference surface.

It cannot always be assumed that the surface of the test object reflects the test illumination uniformly along the entire test object surface. Variations in machining, stains, or material composition can cause the reflectance of the test object surface to vary. The system in accordance with the present invention can, however, be calibrated to accommodate such variations in test object surface reflectivity. In one approach, the reflectivity of the test surface is measured first without any attenuating medium present and then with the attenuating medium in place. Similarly, a first measurement is taken employing a fluid containing a first concentration of a dye and then a second measurement is taken with a fluid containing a second concentration of dye present. These measurements can then be used to produce a set of calibration data that is used to calibrate the system according to varying reflectivity of the test object surface and eliminate the effects caused by the differences in reflectivity. Digitization of the calibration data as provided in the present invention allows such corrections to be made consistently and accurately.

In a second approach as illustrated for example in FIG. 2, the effects of surface reflectivity are removed by making measurements at two separate average wavelengths $\lambda_1$ and $\lambda_2$. An optical filter 52 is used to select the wavelength recorded by the camera. The filter is coupled to a conventional translation device 54 controlled by computer 42 for selectively translating filter 52 into and out of the path of the reflected radiation that effectively provides the test object surface image incident on camera 34. A first image of the test object surface is obtained with filter 52 removed from the image path, as illustrated in FIG. 2. This first image is taken at an averaged spectral wavelength $\lambda_1$ to which the dye has a spectrally averaged absorption coefficient $\alpha_1$. A second image is obtained with filter 52 intersecting the image path. This second image is taken at an averaged spectral wavelength $\lambda_2$ to which the dye has a spectrally averaged absorption coefficient $\alpha_2$. For the image obtained with wavelength $\lambda_1$, the measured intensity of the returned or reflected light $I_{m1}$ at a given pixel location is described by the equation:

$$I_{m1} = I_{i1} exp(-2\alpha_1 d) R_1$$

where $I_{i1}$ is the effective incident intensity at that pixel location, d is the thickness of the dye layer at that pixel location, and $R_1$ is the reflectivity of the surface at that pixel location. Similarly, the measured intensity of the returned or reflected light $I_{m2}$ for wavelength $\lambda_2$ at that same pixel location is given by the equation:

$$I_{m2} = I_{i2} exp(-2\alpha_2 d) R_2$$

where $I_{i2}$ is the effective incident intensity at that pixel location, d is the thickness of the dye layer at that pixel location, and $R_2$ is the reflectivity of the surface at that pixel location. Assuming that the surface reflectivity is independent of wavelength, which is a reasonably good approximation for most metals, $R_1$ equals $R_2$ in the two above equations for each pixel location. The ratio of the measured intensities at the two wavelengths is thus given by the following equation:

$$I_{m2}/I_{m1} = (I_{i2}/I_{i1}) exp\{-2(\alpha_2 - \alpha_1)d\}$$

which no longer involves the reflectivities $R_1$ and $R_2$ of the surface. In this equation, all parameters are known except the ratio $I_{i2}/I_{i1}$ and the distance d to be determined. The ratio $I_{i2}/I_{i1}$ can be determined using a calibration feature, groove or line of known dimensions (i.e., a shim 22 could contain a groove of known depth). Alternatively, a photodiode or other light measuring device can be used to directly measure the intensity of the incident radiation at each wavelength and, therefore, determine the unknown ratio $I_{i2}/I_{i1}$ in the above equation. Solving the above equation for d yields the following equation:

$$d = \ln\{(I_{m1} I_{i2})/(I_{m2} I_{i1})\}/\{2(\alpha_2 - \alpha_1)\}$$

for each pixel location, which is independent of the reflectivity of the surface. This Just described method for correcting for differences in reflectivity of the test surface is carried out by computer manipulation of the digitized signals corresponding to the image within image sensor 34. Each measured image, at the respective wavelengths, is stored in digitized form. These digital signals are processed according to the equations Just described to produce a set of correction data that is used to produce an image free of errors caused by varying reflectivity across the test object surface.

As noted, this Just described method for correcting for differences in reflectivity requires making measurements at two separate averaged wavelengths $\lambda_1$ and $\lambda_2$. In the above described procedure, the filter 52 was moved in and out of the image path between the surface of interest and the camera 34. Other procedures could be used to obtain the data at the two wavelengths. For example, two different filters with different spectral characteristics could be used. Or the filter 52 or different filters could be placed between the light source 32 and the surface of interest.

For larger parts, it may be desirable to correct the intensity data received at the image sensor for the increase in optical depth toward the edge of the camera's optical field. The corrected intensity $I^c(x,y)$ at a point $(x,y)$ can be found from the following equation:

$$I^c(x,y) = I(x,y)[\cos(\theta)]$$

where $I(x,y)$ is the uncorrected intensity at point $(x,y)$ and $\theta$ is the angle between the camera's optical axis and the light ray from the camera to point $(x,y)$. When the angle $\theta$ is small this correction is also small and can, therefore, be disregarded. Thus, with relatively small parts, which can fit into a narrow portion of the camera's optical field of vision, this correction can usually be omitted except where the highest degree of accuracy is needed. Even for larger parts, the camera can be moved relative to the part's surface and multiple images of the surface taken such that all surfaces of interest are contained and recorded within a narrow portion of the camera's optical field.

The apparatus and methods just described for correcting various potential errors in the image of the test object surface are collectively referred to herein as means for calibrating the system and method steps for producing correction data. These means and methods also include those to be described in detail below. The various means and methods can be used individually or in various combinations to correct whatever errors are present within the test object surface image.

The errors associated with the image formed are herein collectively referred to as optically generated errors. Optically generated errors can be caused by the nature of the test object surface or by the components of the electro-optical gauging system employed in association with this invention.

As noted above, the various corrections and calibrations are carried out using computer software. Generally, although other general procedures could be used, these software techniques involve storing intensity data for each location $(x,y)$ or pixel location across the image in a computer register. The corrections or other manipulations involve producing a set of correction data for example by multiplying the contents of the appropriate computer register by a suitable factor (i.e., $\cos(\theta)$ from above) or adding or subtracting the appropriate intensity amount for the calibration procedures employed to the contents of the appropriate register. Not all corrections or calibrations described herein will be appropriate or need to be made for every test object. After all desired corrections or manipulations are made, the intensity data can be plotted using suitable computer-graphics techniques. Such graphics software is available commercially. For example, suitable graphics software can be obtained from Research Systems Inc. of Boulder, Colo. or from Imaging Technology Inc. of Woburn, Mass. Other graphics software packages can also be used.

Figure 5:
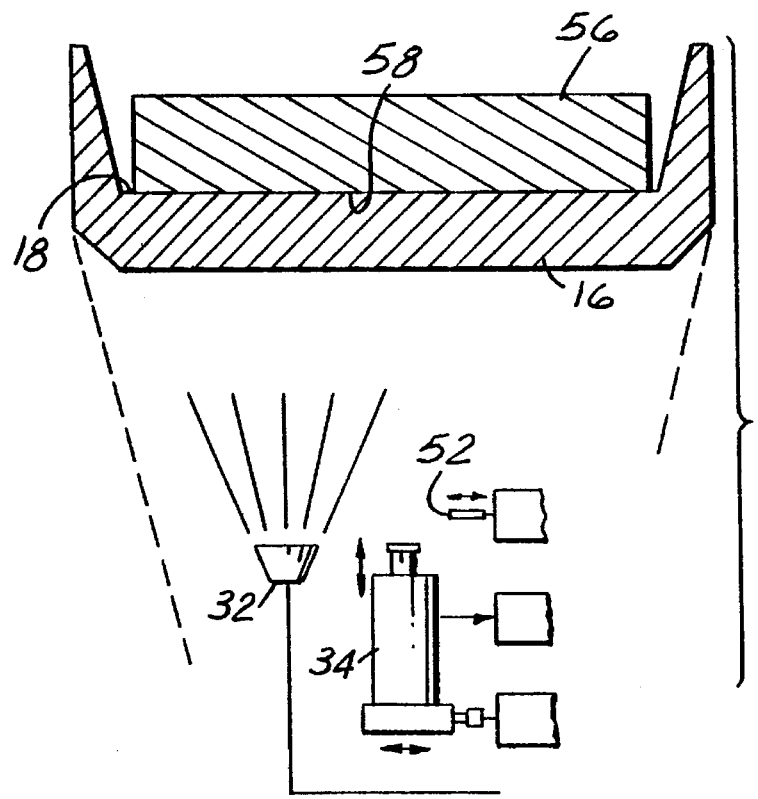
FIG. 5 is a partial diagrammatic view of a means for calibrating the embodiment of the present invention illustrated in FIG. 2.

Provision of the test part surface image in digital form suitable for storage and processing in accordance with the present invention readily accommodates calibration. For example, gain associated with each pixel of the surface image can be obtained and employed during operation in a manner analogous to that disclosed in U.S. Pat. No. 4,960,999 which is assigned to the same assignee as the present application and which is hereby incorporated by reference. Because the test part surface may not be uniformly illuminated by the light source 32, or the response of the camera elements may be spacially non-uniform, the system of the present invention preferably includes the capability of correcting for non-uniform illumination and/or detector response. Specifically and as illustrated in FIG. 5, if during a measurement the illumination geometry does not change and the strength of the illumination is held constant, spacial variations in illumination uniformity are accommodated by placing an object 56 having a surface 58 of known uniform reflectance in place of the test object on master surface 18 without the presence of attenuating fluid. The reflected image can then be measured and used to create a two-dimensional map of correction data to normalize the reflected image pixels during a test operation with the fluid in place. This two-dimensional map of correction data need only be reobtained if system geometry or detector characteristics change. For a system in which the test part surface occupies a large portion of the field of view of the camera, the light path through the dye film may not be perpendicular to the master and test surfaces across the entire image. However, such non-uniform optical path lengths can readily be accommodated through calibration techniques and generation of correction maps in a manner similar to that previously described as long as the size of the test part and the physical positioning of the light source, test part, and camera remain constant.

Figure 6:
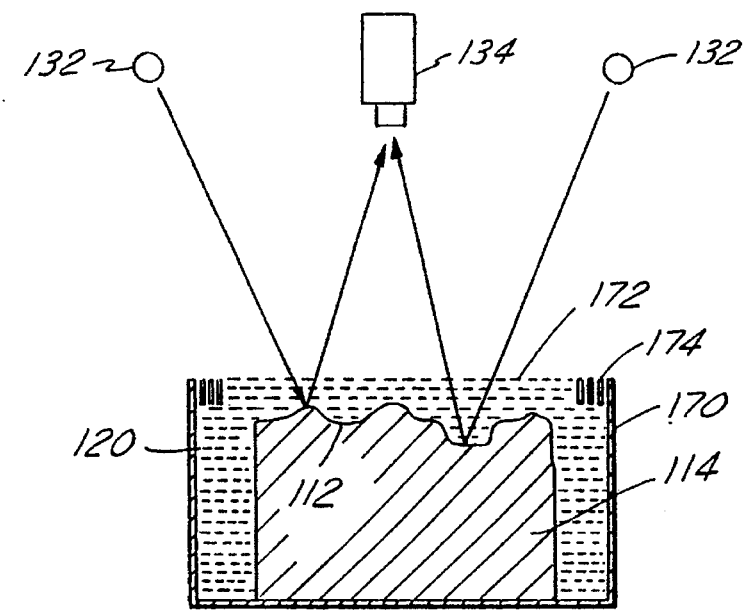
FIG. 6 is a partial sectional diagrammatic view of a modified embodiment of the invention wherein a reference surface is the fluid-air interface.

As one skilled in the art will realize, the manufacture of a master support and its master surface will become more expensive and technically difficult as the dimensions of the test object increases. It is desirable, therefore, to provide a system wherein the master support and its master surface are not required so that the methods associated with the present invention can be more easily applied to very large objects such as, for example, automobile doors and the like. This can be accomplished by placing the object to be evaluated in a container of the attenuating fluid (e.g., dyed fluid) whereby the part is completely submerged in the attenuating fluid. FIG. 6 illustrates the gauging apparatus of the present invention where the test object is submerged within the attenuating fluid and the interface of the attenuating fluid and air is used as the reference surface. As shown in FIG. 6, the test part 114 is placed or submerged in the attenuating fluid 120 contained in fluid tank 170. Electromagnetic radiation from electromagnetic radiation source 132 is passed through the attenuating fluid/air interface 172, through the attenuating fluid, striking the test object surface 112, and then directed to the image sensor 134 (e.g., a camera). The attenuating fluid/air interface acts as, and replaces, the reference or master surface 18 of FIGS. 1, 2, and 5. The electromagnetic radiation is attenuated as it passes through the attenuating fluid and the amount of attenuation is dependent on the distance traveled. By measuring the attenuated electromagnetic radiation reflected from the surface 112, the deviations from a known geometry can be determined using the same procedures as described above in this specification. In other words, the data from the image sensor 134 is digitized and then sent to, and manipulated by, a computer (not shown) in the same manner as described above. Various filters (also not shown) can also be used to correct optically generated errors in the same manner as described above.

In operation, test object 114 is placed in the tank 170 of attenuating fluid 120. Once the attenuating fluid surface 172 has settled, the flat surface (i.e., the attenuating fluid/air interface) is suitable for use as a reference or master surface.

To decrease the time required for the surface 172 to stabilize and to minimize vibrations of the surface 172 during operation, baffles 174 or other damping devices can be used. For example, tank 170 could be mounted on a vibration damping pad or support (not shown). Or a thin film of a higher viscosity fluid could be placed on the fluid surface. For example, if water is used as the attenuation fluid 120, a thin layer of oil could be applied to the water surface to reduce waves or ripples. Such a thin film may also serve as an antireflective coating. Examples of suitable attenuating fluid include water, oils, silicone fluids, organic liquids, and the like. Generally fluids of relatively low viscosity and relatively low volatility are preferred. As one skilled in the art will realize, the resolution of the present system using the attenuating fluid/air interface as the reference surface will be dependent, in large part, on the stability of that interface. Thus, measures that enhance that stability, including, for example, minimization of vibrations and reduction of evaporation from the surface, will increase the resolution obtainable and are, therefore, preferred. For attenuating fluids that are relatively volatile, the evaporation can be reduced, and the resolution increased, by applying a thin film of a non-volatile, non-miscible, low density liquid or fluid to the surface of the attenuating fluid. The attenuating effect of such a surface film or layer can be determined during calibration and then accounted for during routine operations.

Once the surface 172 has settled, electromagnetic radiation from source or sources 132 is directed towards the object surface 112 to be evaluated. The electromagnetic radiation passes through the attenuating fluid 120, is reflected off the surface 112, passes again through the attenuating fluid 120, and is collected at the image sensor 134. By measuring the attenuation of the electromagnetic radiation across the surface 112, the surface profile can be determined. If the desired surface profile is flat, the attenuation fluid/air interface can be used as the direct reference surface and deviations from a flat planar surface can be measured directly. If the described surface geometry deviates from planar, a calibrated or reference test part is used to calibrate the instrument. The surface profile of the calibrated test part is preferably stored in the computer and then compared to the data generated from test object 114 to determine deviations from the desired surface profile.

Figure 7:
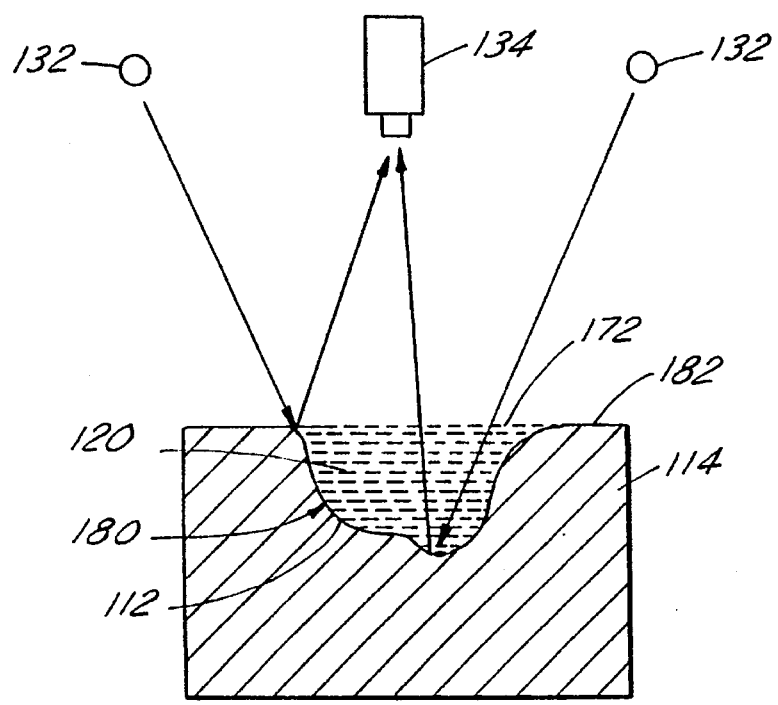
FIG. 7 is a partial sectional diagrammatic view of an implementation of the invention wherein a portion of the test object contains an attenuating medium.

FIG. 7 illustrates the use of the attenuating fluid/air interface as the reference surface where the test object has a depression, valley, or basin that can receive and hold the attenuation fluid (i.e., a fluid receptacle). As shown in FIG. 7, a depression 180 of a test object 114 is filled with attenuation fluid 120. The attenuation fluid/air interface 172 acts as the reference or master surface in the same manner as described for FIG. 6 above. In this manner, the surface profile 112 of the depression 180 can be determined. As one skilled in the art will realize, this modified method can generally only be used to evaluate surfaces within depressions 180 which can contain the attenuating fluid 120. Thus, this modified method is not suitable for evaluation of the flat portions 182 of the test object or other portions that could not hold and contain the attenuating fluid. This method could be used to advantage for large objects where the critical dimensions or profiles of interest are contained, or predominantly contained, within depressions or hollowed-out areas in the test object.

As one skilled in the art will realize, other gases, including a vacuum, could be used above the attenuating fluid to form the attenuating fluid/air interface for use as a reference surface. Generally, ambient air is preferred due mainly to ease of operation and avoidance of gas containment and handling systems. Other gases can, of course, be used, including inert gases such as carbon dioxide, nitrogen, argon, and the like. Mixtures of gases can also be used. As used in this specification in regard to the attenuating fluid/air interface, the term "air" is intended to be a generic term including such gases.

Figure 8:
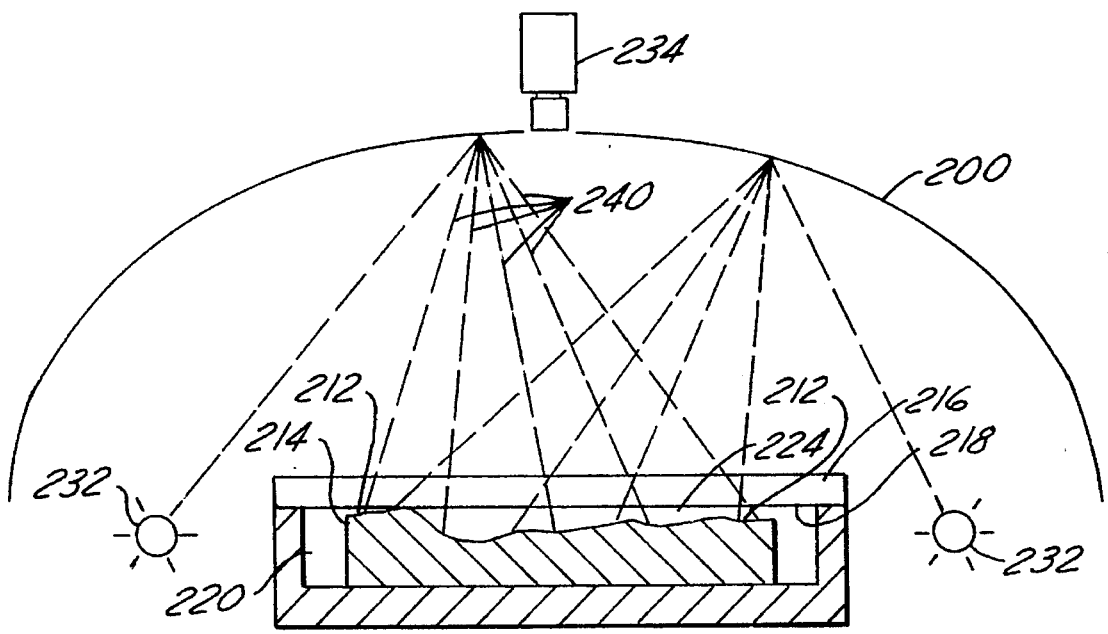
FIG. 8 is a partial diagrammatic view of a preferred embodiment of the invention wherein the electromagnetic radiation source is positioned behind a specular surfaced test object and a diffuse reflective canopy is employed.

FIG. 8 illustrates another embodiment of this invention especially adapted to gauge specular surfaced objects. A diffuse reflective canopy 200 is placed over the entire test object surface. Diffuse canopy 200 can be of any shape that will reflect electromagnetic radiation towards the test object 214. Electromagnetic radiation sources 232 are placed adjacent test object 214 and beneath canopy 200. As will be further explained below, electromagnetic radiation from electromagnetic radiation sources is directed at diffuse reflective canopy 200, effectively producing illuminating rays 240 that travel through master surface 216 and reference surface 218, into attenuating film 224, onto test object surface 212, and then back through the attenuating film 224 and master surface 216 to image sensor 234. Using conventional techniques, the electromagnetic image received at image sensor 234 is converted into digital signals suitable for computer manipulation. Using the computer and the software techniques associated with the computer workstation (not shown here but described in relation with FIG. 1), the deviations of the specular test object surface 212 from a preselected nominal geometry can be determined and displayed generally as detailed above.

In another embodiment, the master surface 216 is eliminated. In this embodiment the distance between the test object surface 212 and image sensor 234 is determined to gauge surface 212.

Attenuating medium 220 can be a liquid or a gas. Suitable liquids may include a dye that attenuates electromagnetic radiation as described above. Suitable gases include carbon dioxide, nitrous oxide or water vapor. Ambient air could be combined in a chamber with carbon dioxide. Carbon dioxide preferably is present in a concentration ranging from a minimum amount above ambient air to 100% total chamber volume. Proper gas mixing must be ensured through conventional gas mixing techniques to prevent introducing errors caused by variations in the concentration of the attenuating gases across the image. Water vapor could be used when the test object is appropriately placed within a humidity chamber, for example.

Figure 9:
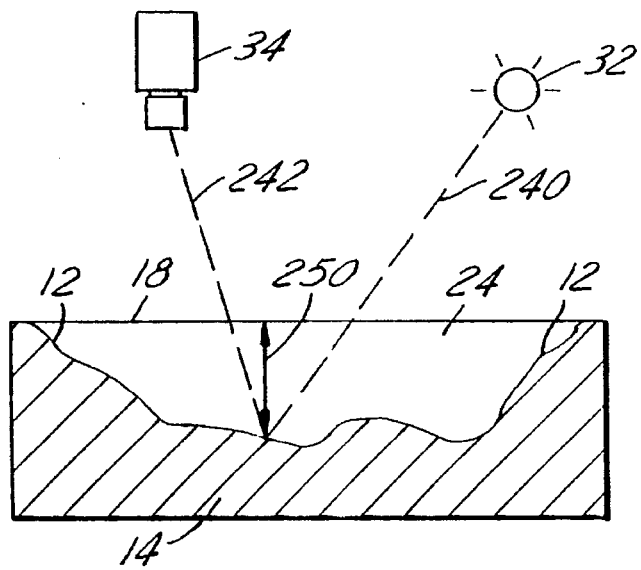
FIG. 9 is a partial sectional diagrammatic view of an embodiment of the present invention showing the reflective behavior of the electromagnetic radiation when a diffuse surfaced test object is gauged.

FIG. 9 generally illustrates the behavior of electromagnetic radiation as it travels from electromagnetic radiation source 32, through reference surface 18 and attenuating medium 24, reflects from diffuse test object surface 12, and travels back through attenuation film 24 to image sensor 34. Illuminating ray 240 will instigate a reflective ray 242 to the image sensor 34. Reflective ray 242 will travel to image sensor 34 because of the nature of the diffuse test object surface 12. The distance between the test object surface 12 and the reference surface 18 is shown generally at 250.

Figure 10:
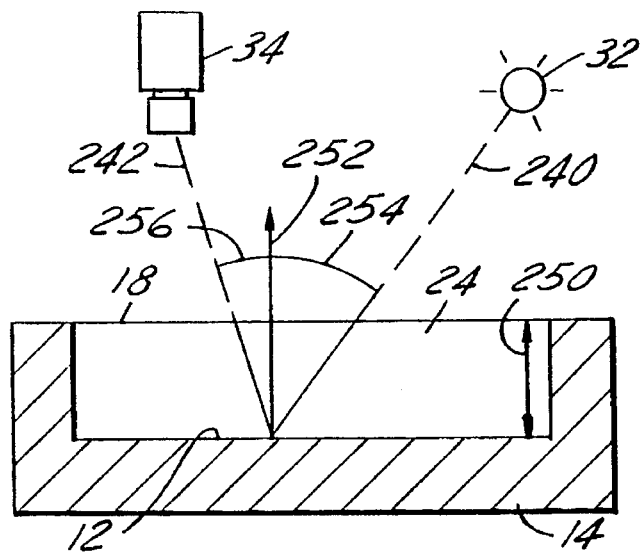
FIG. 10 is a partial sectional diagrammatic view of an embodiment of the present invention showing a method of calculating the distance between a diffuse surfaced test object and a reference surface.

FIG. 10 generally diagrammatically illustrates a method of calculating the distance 250 between diffuse test object surface 12 and reference surface 18. The overall distance $D_1$ traveled by the electromagnetic radiation through attenuation film 24 is given by the equation:

$$D_1 = d/\cos(\theta_{c1}) + d/\cos(\theta_{s1})$$

where $\theta_{s1}$ is the angle 254 between the normal 252 to reference surface 18 and electromagnetic radiation source 32, $\theta_{c1}$ is the angle 256 between the normal 252 to reference surface 18 and image sensor 34, and d is the distance 250 between test object surface 12 and reference surface 18.

Distance $D_1$ can be determined by solving:

$$I_{m1}=I_{i1}R_1 exp(-D_1/\kappa)$$

where $I_{m1}$ is the intensity of electromagnetic radiation received by image sensor 34, $I_{i1}$ is the intensity of illuminating ray 240, $R_1$ is the reflectivity of the test object surface 12 for angles $\theta_{c1}$ and $\theta_{s1}$, and $\kappa$ is the extinction coefficient of the attenuating medium. The above two equations can be solved for:

$$d=\{-1n(I_{m1}/(I_{i1}R_1))/\kappa\}\{1/\cos(\theta_{c1}) +1/\cos(\theta_{s1})\}$$

where the term $(I_{m1}/(I_{i1}R_1))$ is previously described in the present application and, therefore, distance d illustrated generally at 250 is determined for a diffuse test object surface.

There are potential problems with implementing the just described method of calculating the distance 250 between a test object surface and a corresponding reference surface. The calculation is limited by the relationship between $\theta_{s1}$ and $\theta_{c1}$. If electromagnetic radiation enters simultaneously at a second angle $\theta_{s2}$, such that $\cos(\theta_{s2})$ differs from $\cos(\theta_{s1})$, an error will be introduced. Depending on the application, this error may be unacceptably large. In the instance where two incoming rays at angles $\theta_{s1}$ and $\theta_{s2}$ are reflected back to image sensor 34, the radiation received by image sensor 34 is given by the equation:

$$I_m=I_{i1}R_1 exp(-D_1/\kappa)+I_{i2}R_2 exp(-D_2/\kappa)$$

where $D_1$ and $D_2$ are the total distances through the attenuating medium from a first and second radiation source, respectively. Assuming $\cos(\theta_{s1})$ equals $\cos(\theta_{s2})$, this equation can be solved for distance d between test object surface 12 and reference surface 18. This assumption will be valid if the incident electromagnetic radiation is unidirectional or limited to a narrow cone around the optical axis of image sensor 34.

Figure 11:
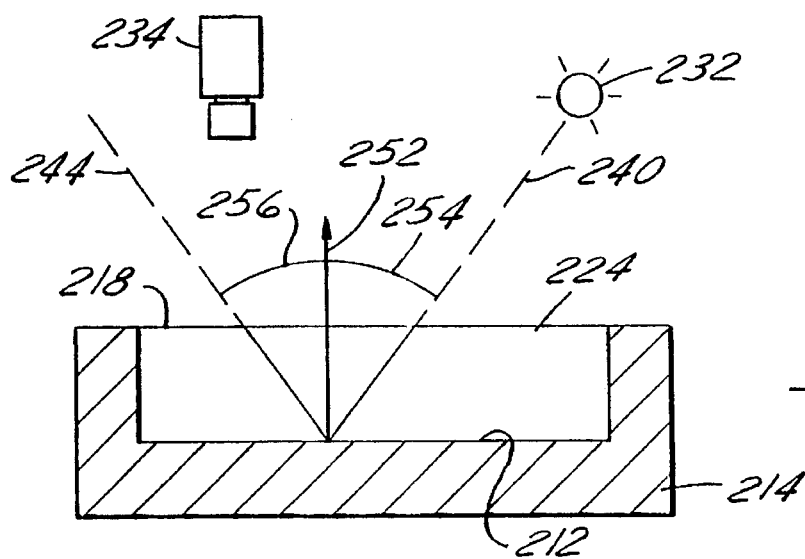
FIG. 11 is a partial sectional diagrammatic view of an embodiment of the present invention showing the reflective behavior of the electromagnetic radiation when a specular surfaced test object is gauged.

FIG. 11 illustrates the general behavior of electromagnetic radiation as it reflects off of a specular surfaced test object 214. As illuminating ray 240 travels through the reference surface 218, attenuating film 224, reflects off of test object surface 212 and travels back through attenuating film 224, the reflective ray 244 does not travel to image sensor 234. Therefore, image sensor 234 does not receive radiation intensity information about that portion of the test object surface 212 illuminated by illuminating ray 240. This phenomenon can be explained by the law of geometrical optics that the angle of incident radiation is equal to the angle of reflectant radiation when the reflecting surface is specular.

Figure 12:
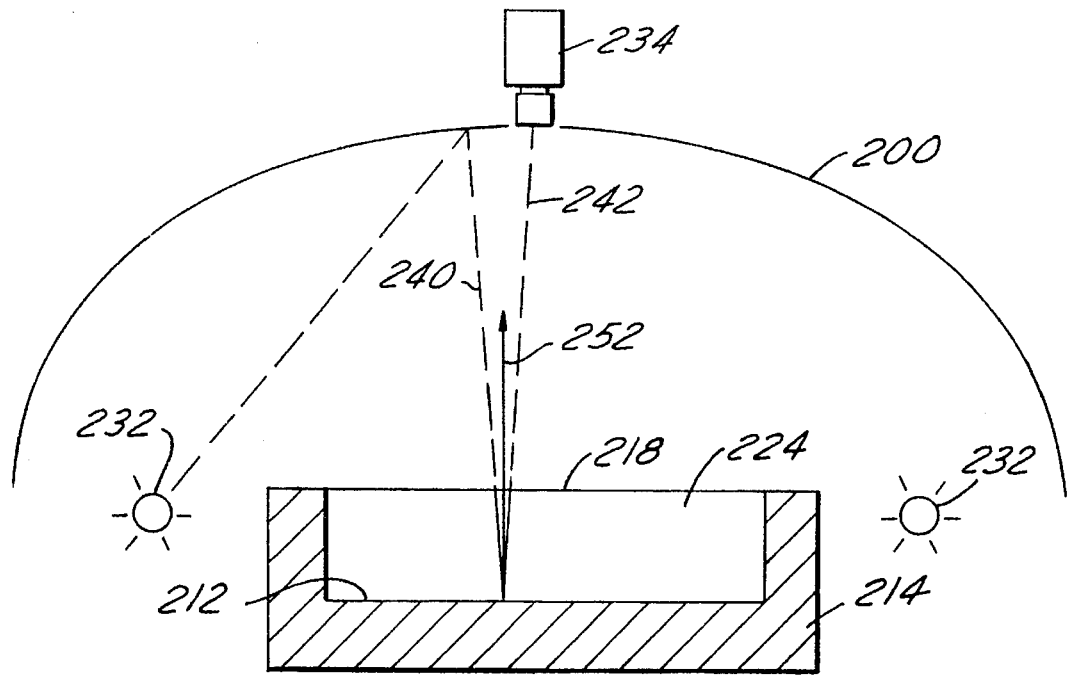
FIG. 12 is a partial sectional diagrammatic view of an embodiment of the present invention wherein a diffuse reflective canopy is employed showing the reflective behavior of the electromagnetic radiation when a specular surfaced test object is gauged.

FIG. 12 generally illustrates how the embodiment of FIG. 6 enables one to calculate the distance between a specular test object surface 212 and a reference surface 218 in accordance with the methods associated with the present invention. Multidirectional electromagnetic radiation sources 232 emit radiation towards diffuse reflective canopy 200 which effectively instigates a shower of illuminating rays 240 that travel through reference surface 218, attenuating film 224 and reflect off of specular test object surface 212. One of these illuminating rays 240 will have an angle of incidence sufficient to produce a reflective ray 242 that reaches image sensor 234. The previously described algorithm and method of calculating the distance between a test object and a reference surface will not work for a specular test object in this embodiment because the angle of incidence is not specified or known. The illuminating ray 240 is determined by the orientation of the test object 214 at the point being gauged. Further, FIG. 10 illustrates how the angle between illuminating ray 240 and the normal 252 to test object surface 212 equals the angle between normal 252 and reflective ray 242.

Figure 13:
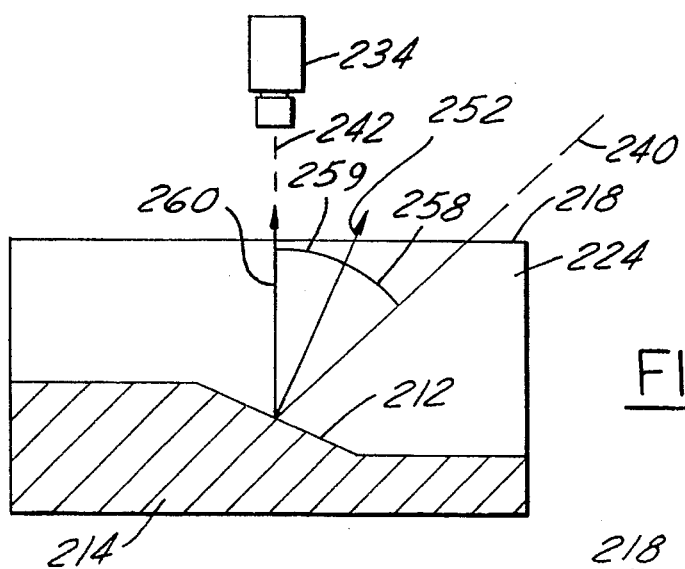
FIG. 13 is a partial sectional diagrammatic view of an embodiment of the present invention showing a method of calculating the distance between a specular surfaced test object and a reference surface.

FIG. 13 more particularly diagrammatically illustrates the method of calculating the distance between specular test object surface 212 and reference surface 218. Test object 214 is disposed within a testing station, (similar to that shown in FIG. 1) and beneath the diffuse reflective canopy 200 (shown in FIG. 8), such that an attenuating medium 224 exists between test object surface 212 and reference surface 218. Illuminating ray 240 travels into attenuating medium 224 from diffuse reflective canopy 200, reflects off test object surface 212 and travels back through attenuating medium 224 into image sensor 234. For simplification, the illustrated embodiment and the following discussion include the assumptions that the optical axis of image sensor 234 is aligned with the normal 260 to the reference surface 218. The angle between the illuminating ray 240 and the normal 260 to the reference surface is equal to two times the angle of incidence, therefore, the total distance, D, traveled by the electromagnetic radiation through attenuating medium 224 is given by the equation:

$$D=d+d/\cos(2\theta)$$

where d is the distance between test object surface 212 and reference surface 218 along surface normal 260, $\theta$ is the angle of incidence which is equal to the angle of reflection because angle 258 equals angle 259 due to the law of geometrical optics that the angle of incidence is equal to the angle of reflection for a specular surfaced object. D can be determined from the earlier discussed calculations by the equation:

$$D=-1n(I_{m1}/(I_{i1}R_1))/\kappa$$

where $I_{m1}$ is the intensity of electromagnetic radiation received by image sensor 234, $I_{i1}$ is the intensity of illuminating ray 240, $R_1$ is the reflectivity of the test object surface 212 for angle $\theta$, and $\kappa$ is the extinction coefficient.

Figure 14:
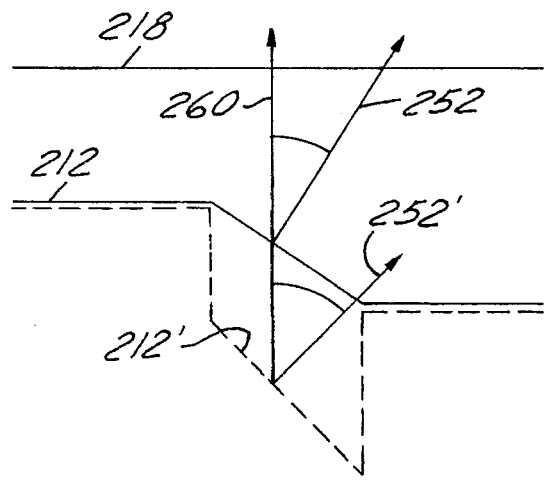
FIG. 14 is a partial sectional diagrammatic view illustrating some of the effects the surface angle of the test object has on the gauging of a specular surfaced test object.

Whenever the angle between a specular surfaced test object and the reference surface is greater than zero, there will be a distortion of the measured distance between the test object surface and the reference surface. FIG. 14 illustrates such a distortion of the distance between reference surface 218 and test object surface 212. The image sensor 234 receives radiation that registers as if the test object is separated from the reference surface 218 by the apparent distance between reference surface 218 and apparent test object surface 212'; i.e.: an optically generated error is introduced. Apparent test object surface 212' has an angle of orientation $\theta'$. The apparent surface angle is related to the true test object surface angle $\theta$ by the equation:

$$\tan(\theta')=(\tfrac{1}{2}(1+1/\cos(2\theta)))\tan(\theta)$$

where $\theta$ is the test object surface angle as defined above to be equal to the angles of incidence and reflection. Defining $\rho$ and d' as:

$$\rho=\tfrac{1}{2}(1+1/\cos(2\theta))$$

and $$d'=D/2$$

it follows, that the distance of apparent test object surface 212' to the reference surface 218 is defined by the equation:

$$d'=\rho d$$

where d' is the distance of apparent test object surface 212' from reference surface 218. Now the true distance d between the test object surface 212 and reference surface 218 can be calculated. Since $\rho=\frac{1}{2}(1+1/\cos(2\theta))$, applying trigonometric identities and substituting into the above equation, yields:

$$\rho=1-(sqrt(1+4\tan^2(\theta'))-1)^2/(2\tan^2(\theta'))$$

which leaves $\rho$ defined in terms of the square of the gradient of the apparent distance between test object surface 212 and reference surface 218. The true distance between test object surface 212 and reference 218 can be calculated by the following method:

(1) Perform the necessary calibration described above to determine the extinction coefficient needed in the equation:

$$D=-\ln(I_{m1}/(I_{i1}R_1))/\rho.$$

(2) Precalculate a table of values expressing the relationship between $\rho$ and $\tan^2(\theta')$ as given in the equation:

$$\rho=1-(sqrt(1+4\tan^2(\theta'))-1)^2/(2\tan^2(\theta')).$$

(3) Submit the test object to the gauging methods as explained in this application and calculate the apparent distance d' using the equations:

$$D=-\ln(I_{m1}/(I_{i1}R_1))/\kappa; \text{ and } d'=D/2.$$

(4) Calculate $\tan 2(\theta')$.
(5) Convert d' to the real distance d using the table from step (2) and the equation:

$$d'=\rho d.$$

In this manner, the distance between specular surfaced test object 212 and reference surface 218 is determined and test object surface 212 can be properly gauged by the methods associated with the present invention. Moreover, this method provides the ability to correct the optically generated errors in the image of the test object caused by the nature of the specular surface.

Figure 15:
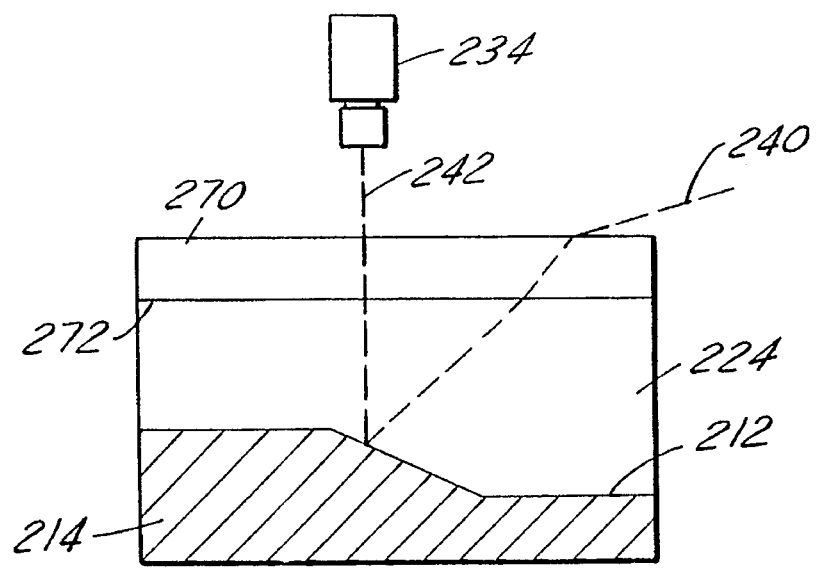
FIG. 15 is a partial sectional diagrammatic view of the effect of refraction on the electromagnetic radiation at the interface between different transparent media.

FIG. 15 illustrates a transparent light conduit 270 as incorporated into another embodiment of the present invention. Light conduit 270 can be constructed of glass, a glass-liquid combination, air or other transparent media. The embodiment illustrated in FIG. 15 incorporates a glass flat as the light conduit 270. Light conduit 270 causes refraction of electromagnetic radiation as it passes through each interface of the light conduit because of the principle of geometrical optics generally known in the art as Snell's Law. Illuminating ray 240 is shown entering light conduit 270 at an angle of approximately 82 degrees and traversing attenuating film 224 at approximately 50 degrees. The illustrated values approximate light behavior with a light conduit index of refraction approximately equal to 1.5 and an attenuating film index of refraction approximately equal to 1.3. As discussed in relation to FIG. 13, the maximum test object surface angle that can be gauged is limited to a value of half the incident angle of the illuminating ray. The illuminating ray will be refracted at the reference surface, thereby limiting the maximum gaugable surface angle. Therefore, the maximum test object surface angle that can be gauged with the configuration of FIG. 13 is approximately 25 degrees. It is desirable to have the capability to gauge test object surfaces that have a surface angle greater than that allowable by a configuration as illustrated in FIG. 13.

Figure 16:
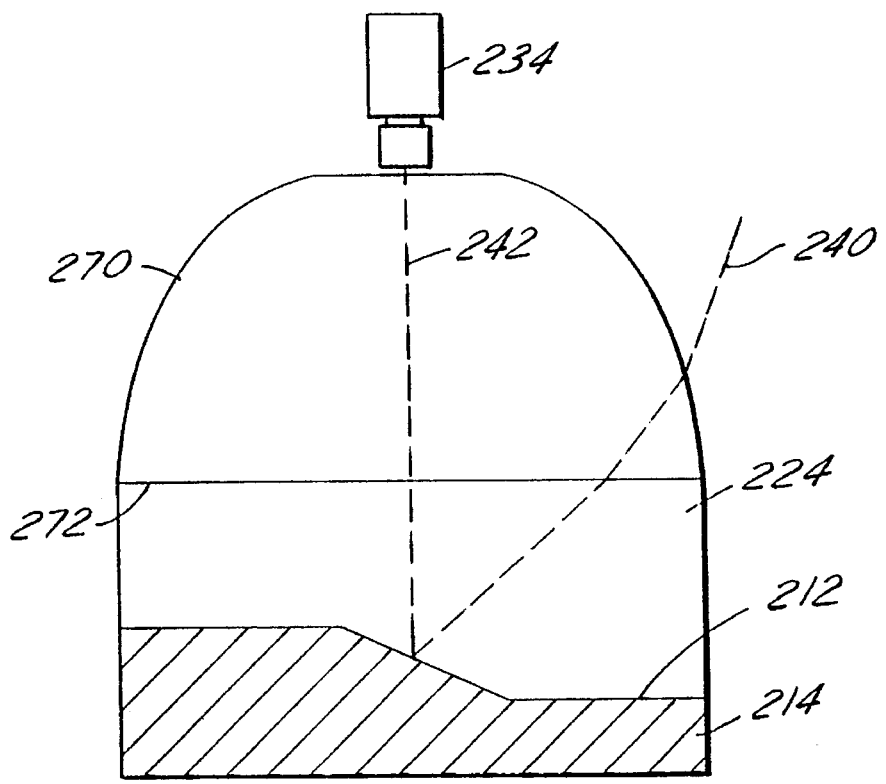
FIG. 16 is a fragmentary partial sectional diagrammatic view of the effect of refraction on the electromagnetic radiation as it travels through a dome shaped transmitting medium.

FIG. 16 illustrates another embodiment of the present invention that increases the ability to gauge test object surfaces having relatively large surface angles. Light conduit 270 now consists of a solid dome shaped piece of glass. Reference surface 272 is preferably essentially transparent to the electromagnetic radiation used. A light conduit shaped as shown in FIG. 16 can be constructed of glass, a glass liquid combination, air or other transparent media. Air would be most useful when the attenuating medium is a gas, for example. The upper surface of a light conduit as shown in FIG. 16 is diffuse except near image sensor 234; a minimum area of clear glass is required for image sensor 234 to record radiation intensity information. In such an embodiment the maximum gaugable surface angle is limited by the area of the reference surface, but not by refraction at the upper surface. Therefore, the embodiment illustrated in FIG. 16 avoids some of the limitations of the embodiment of FIG. 15; allowing the methods associated with this invention to be employed for gauging specular surfaced test objects having relatively large surface angles.

It follows that light conduit 270 and reflective canopy 200 serve generally as means for altering the direction of the illuminating rays 240. More generally light conduit 270 and canopy 200 serve as means for altering the direction of travel of electromagnetic radiation to facilitate gauging specular or shiny surfaced test objects.

Figure 17:
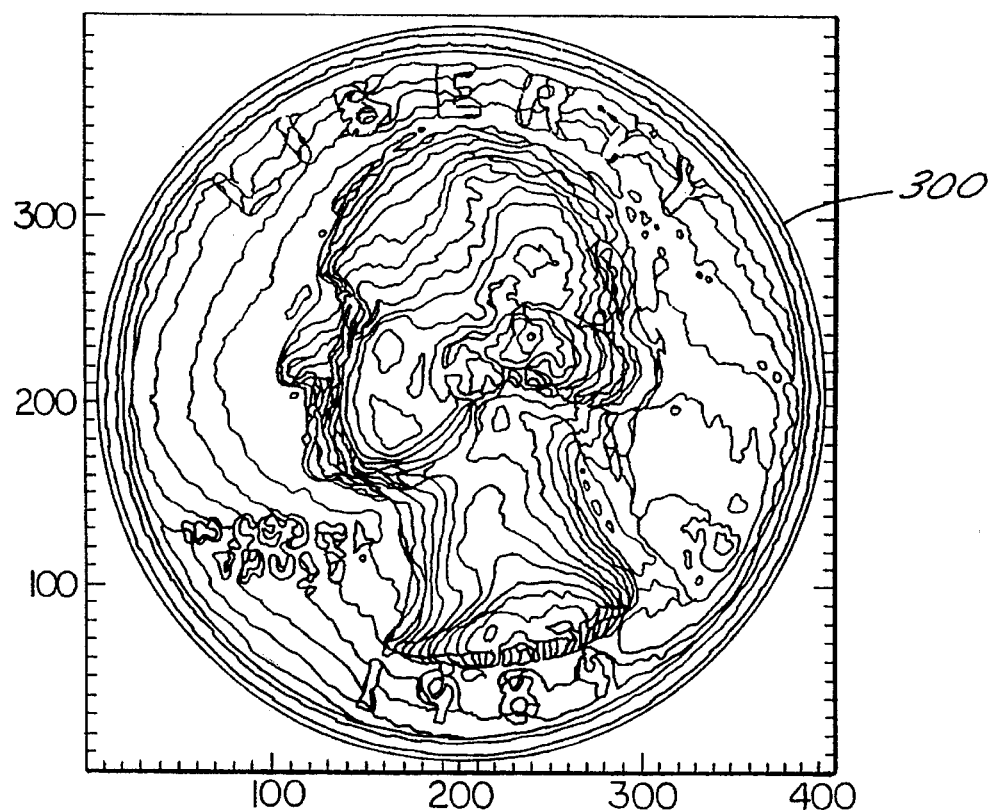
FIG. 17 is a computer-generated image of a standard United States coin generated by the gauging system of the present invention, shown in relation to a scale.

FIG. 17 illustrates the type of results that the inventive system can generate. A United States coin 300 (a quarter) was chosen as a representative specular surfaced object having fine distinctions in distance between the coin surface and a reference surface. Using visible light with a dye fluid (i.e., yellow dye) as the attenuating medium, the image of the surface of the quarter was generated using the present invention. The resulting image is essentially a two dimensional contour representation of the surface of the coin 300. FIG. 15, illustrates the accuracy obtainable with the inventive system for gauging surface profiles of specular surfaced objects. The accuracy obtained depends, in part, on the various methods and apparatus for correcting optically generated errors within the image as described above.

The use of electromagnetic energy in the visible spectrum for both illumination of and reflection from the test object surface is generally preferred. However, electromagnetic radiation from the x-ray region to the microwave region may be employed and may, in some instances, be preferred. An attenuating medium using gas or a liquid including an attenuating dye is generally preferred for use at visible wavelengths. Normally, such an attenuation medium would consists of a dye dissolved in a solvent. Suitable dyes include, for example, india ink, FD&C Blue No. 1, D&C Yellow No. 2, D&C Green No. 6, trans-β-carotene, and the like. Suitable solvents include, for example, water and organic solvents such as alcohols (e.g., methanol, ethanol, tert-butyl alcohol, amyl alcohol, and the like), transmission fluids, cutting fluids, oils, and the like, provided that the dye used is soluble therein. The attenuating medium could also comprise very fine dye powder or a gas or a liquid with a strong absorption band at the illumination wavelength. As described above, suitable gases include ambient air, carbon dioxide, nitrous oxide and water vapor.

The deviations from a nominal surface geometry for transparent parts or low reflectivity parts can also be measured by first coating the surface to be gauged with a reflective coating. The coated surface can then be gauged according to the above-described method for gauging specular surfaced objects. For example, the surface of a glass part can be coated with a thin silver coating. Such a coating can be removed after the measurements are completed (e.g., a silver coating could be removed by an acid wash). As one skilled in the art will realize, such a coating should be as thin as practical to avoid significant loss of resolution which could result from the coating "filling in" or "bridging" depressions and the like in the surface.

Figure 18:
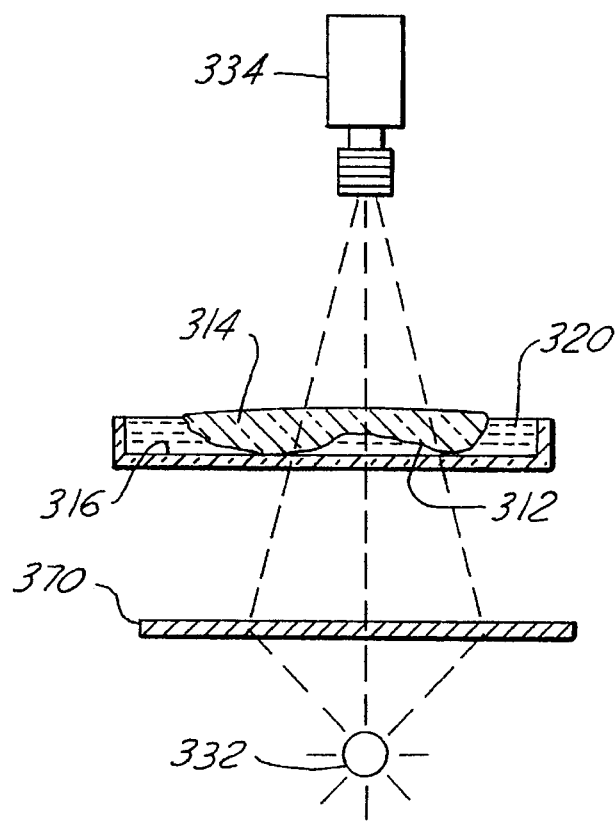
FIG. 18 is a fragmentary partial sectional diagrammatic view of an embodiment of the present invention that is adapted to gauge transparent test objects.

FIG. 18 illustrates another embodiment of the present invention that can effectively gauge the surface profile of a transparent test object. Camera 334 receives electromagnetic radiation emitted by source 332. The radiation first passes through diffuser 370, reference surface 316, attenuating medium 320 and transparent test object 314 prior to being detected by camera 334. The previously described algorithms and methods associated with the present invention used to gauge specular surfaced objects may be employed to gauge the relevant transparent test surface 312. In this embodiment, the attenuating medium preferably has the same index of refraction as the test part. The means for calibrating the system are the same as described above. Another method of calibrating the embodiment of FIG. 18 includes placing a glass flat appropriately in place of test object 314 with a shim of known length supporting one end. Under these conditions, the system can be calibrated by gauging the known distance between the glass flat and reference surface 316 and then using that information to produce a set of correction data to accommodate optically generated errors.

The embodiment of FIG. 18 can be modified by moving the reference surface 316 to the top of diffuser 370 and properly orienting transparent object 314 such that an attenuating medium is between test object 314 and diffuser 370. Diffuser 370 is yet another example of a means for altering the direction of travel of electromagnetic radiation associated with this invention.

When the flatness of the surface of a machined part is measured relative to high tolerances, an optical flat can be used as the master and reference surface. In order to protect the optical surface—which is generally relatively expensive—from potential damage caused by placing a machined part in contact with the optical surface, a plurality of thin masks, shims, or spacers 22 may be placed between the two objects. These shims 22 would typically be placed between the optical surface and the surface to be measured at known fixed points at which surface deviations do not need to be measured. Such shims 22 are illustrated in FIG. 2. In some cases it may not be possible to locate the shims at positions where surface deviations do not need to be measured. In such cases, two different measurements can be made with the shims at different positions to obtain complete coverage of the surface of interest. Alternatively, a jig system that contains mechanical stand-offs or a mechanical fixture 108 (see FIG. 1) can be used to hold the part and prevent the object's surface from coming into contact with the surface of the optical flat.

Generally, however, shims 22 will be preferred due to their simplicity and their possible use as calibration markers. Such calibration markers can consist of grooves, slots or features of known dimensions cut or machined directly into the shims. Grooves of variable depth can be used where the depth of the groove at various locations along the groove is precisely known. In addition to providing for general calibration of the apparatus, such calibration markers can, as noted above, be used to provide the necessary calibrations used in eliminating the effect of varying reflectance of the surface.

As noted above, optical flats are relatively expensive to prepare and can be damaged if the optical flat and the test object surfaces come into contact. Shims 22, as noted above, are one way to minimize damage to the optical flat used as the master surface. As one skilled in the art will realize, however, the master surface will eventually be damaged during use and the probability of damage will increase as the number of parts tested increases. Another way in which to minimize damage to the optical flat is to simply eliminate its use as the master surface. Rather a commercial-grade glass plate (e.g., float plate glass) can be used as the master surface and the optical flat can be used as a "standard" test object to calibrate the glass plate. By placing the "standard" test object on the master surfaces, preferably with shims 22 supporting the "standard" test object, the differences between the glass plate and the optical flat can be measured and stored in the computer. By measuring actual test objects against the glass plate and using the stored optical flat calibration data, the actual test objects can be compared to the optical flat without exposing the optical flat "standard" test object to potential damage. Recalibration using the "standard" test object will be necessary from time to time to simply check the system's operating characteristics or whenever the glass plate master surface is replaced. In any event, exposure of the relatively expensive optical flat test object to potential damage will be significantly reduced.

Generally, as noted above, the electromagnetic radiation used is preferably in the visible spectrum. Other forms of electromagnetic radiation can be used and in some cases may be preferred. For example, microwave radiation can be used to gauge both exterior and interior surfaces of complex metal parts (such as a machined mold or a casting). To use microwave radiation, a gauge block or die is machined from a dielectric material that is highly transmissive at the microwave frequency being used. This gauge block is machined to have exterior and interior surfaces that are nearly a matched surface of the object being measured. The exact dimensions of the gauge block are chosen so that the gauge fits closely against (and inside if need be) the surfaces of the object being tested. The dielectric gauge block is then fitted next to (i.e., placed against or into as is appropriate) the metal surfaces to be measured. The dielectric gauge block is irradiated with microwaves that transmit through the dielectric and onto the metal surfaces. The strength of the signal reflected from all points (interior and exterior) on the object is first measured with a microwave detection system. Next, a partially conductive fluid (e.g., a dielectric fluid containing some carbon powder) is placed between the gauge block and the test object, the gauge block and the test object are again fitted together, and the dielectric gauge block is again irradiated with microwaves. The microwaves transmit through the dielectric, are attenuated by the resistive dielectric fluid, are reflected back from the metal surface, are attenuated again by the resistive fluid, and finally propagate back out through the dielectric gauge block. The strength of the microwave signals reflected from each point (interior and exterior) on the test object is measured and digitized. Using the intensity of signal measured at each point on the test object surface, the signal attenuation can determined. From the attenuation, the separation (thickness of the layer of attenuating fluid) at all surface points between the gauge block and the test object is determined. By comparing the measured separation with the design specifications for the test object, deviations in the shape of a manufactured object from its design specifications are directly measured.

The resolution of the system (especially for the non-depth portion) is determined in large part by camera geometry. For example, if a CCD camera with a 512×512 element array were used to image a surface 50 cm×50 cm, each pixel would correspond to about 1 mm×1 mm of the surface. The resolution of the system can be decreased or increased as needed using various techniques. For example, a CCD camera with a larger array could be used. If the image array of such a camera was increased to 1024×1024 elements, each pixel would correspond to about 0.5 mm×0.5 mm of the same 50 cm×50 cm surface (i.e., approximately two fold increase in resolution). Resolution may also be modified by changing the effective focal length of the camera lens. By moving camera 34 closer to the test surface 12 (i.e., moving the camera in the vertical direction in FIG. 2) will increase the resolution but will decrease the percentage of the test part surface that can be observed with a given measurement. To obtain full analysis or coverage of the test part surface it may be necessary, in such a case, to take multiple measurements for a given part. Such multiple measurements could be made by moving the master surface and test part while holding the camera fixed or, preferably, by moving the camera into the desired positions (i.e., moving the camera in the horizontal direction in FIG. 2) using translator 60 (as shown in FIG. 2) to obtain complete coverage of the test part surface. By combining the measurements, analysis of the entire surface can be obtained. Translator 60 can also be used to vary the distance between the camera 34 and the test part surface 12. If desired, separate translators can be used to control movement of the camera in the vertical and horizontal directions. Preferably the translator 60 or translators are under computer control. The effective focal length and, therefore, camera resolution can also be modified by use of a zoom-type lens on the camera 34. Such a lens would eliminate the need for movement of the camera in the vertical direction. Again, it is preferred that the zoom-type lens is under computer control. For these general purposes, camera 34 is coupled to a translator 60, as shown in FIG. 2, which is controlled by computer 42.

Figure 19:
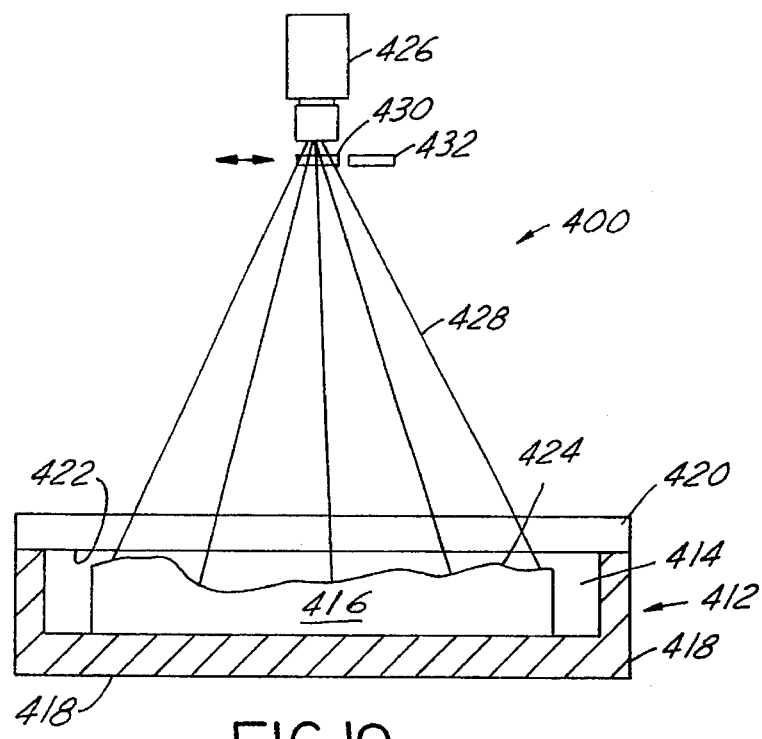
FIG. 19 is a partial sectional diagrammatic view of a presently preferred embodiment of the invention.

FIG. 19 illustrates another embodiment of this invention wherein an image of the test object is detected and formed using the naturally emitted infrared radiation that emanates from the test object. Selected components of the optical gauging system are shown in FIG. 19 at 400. Test chamber 412 is used to contain attenuating medium 414 and test object 416. Test chamber 412 is shown having end walls 418 and a transparent master surface 420. It is to be understood that "transparent" means transparent to or essentially transparent to the infrared radiation being sensed to form the image. Master surface 420 provides reference surface 422 which is utilized to gauge the surface profile of test object surface 424. Image sensor 426 is capable of sensing the naturally emitted infrared radiation from the test object 416. The infrared radiation rays are shown at 428. Filters 430 and 432 are provided in the pathway of rays 428 allowing image sensor 426 to sense images of the intensity of the infrared radiation emanating from test object 416 at two wavelengths as further described below. Similar to the embodiments described above, intensity of the infrared radiation emanating from test object 416 varies across the image of the test object surface 424 as a function of distance the infrared radiation travels through the attenuating medium 414 as it travels towards image sensor 426.

Figure 20A:
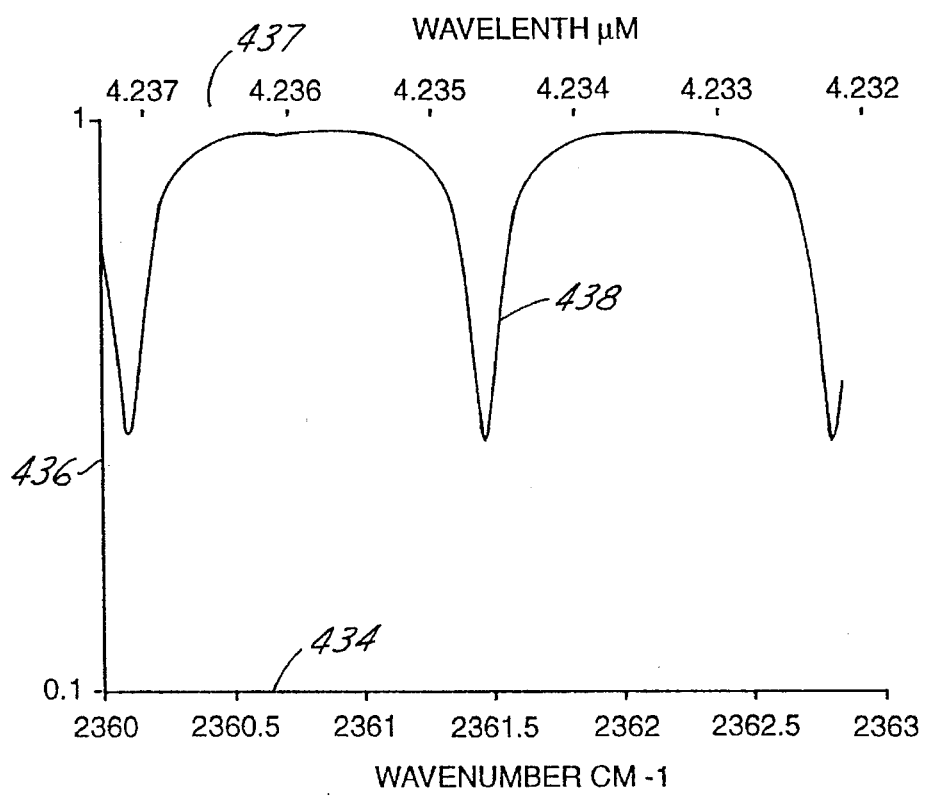
FIG. 20A is a high resolution infrared absorption spectrum for $CO_2$.

In the embodiment of FIG. 19, a gas attenuating medium is especially preferred. Gas is preferred, in part, over the liquid dyes discussed above, because a liquid attenuating medium would tend to change the temperature of the test object. For purposes of simplification, whether the attenuating medium consists of a liquid, a gas, or both the attenuating medium will simply be called a dye. Infrared-absorbing dyes that are preferred for use in accordance with this invention include $CO_2$, water vapor and nitrous oxide. $CO_2$ absorbs strongly at 2.7 micrometers, 4.3 micrometers and 14.5 micrometers. Water vapor absorbs strongly at 1.4 micrometers, 1.9 micrometers, 2.7 micrometers and 6.5 micrometers. FIG. 20A illustrates the high resolution spectrum for $CO_2$ (courtesy of Gall Anderson, Phillips Laboratory). FIG. 20A includes wave number axis 434, axis 436 and wavelength axis 437. The high resolution spectrum plot for $CO_2$ is shown by the curve indicated at 438. The spectrum is plotted relative to the scales just described.

Figure 20B:
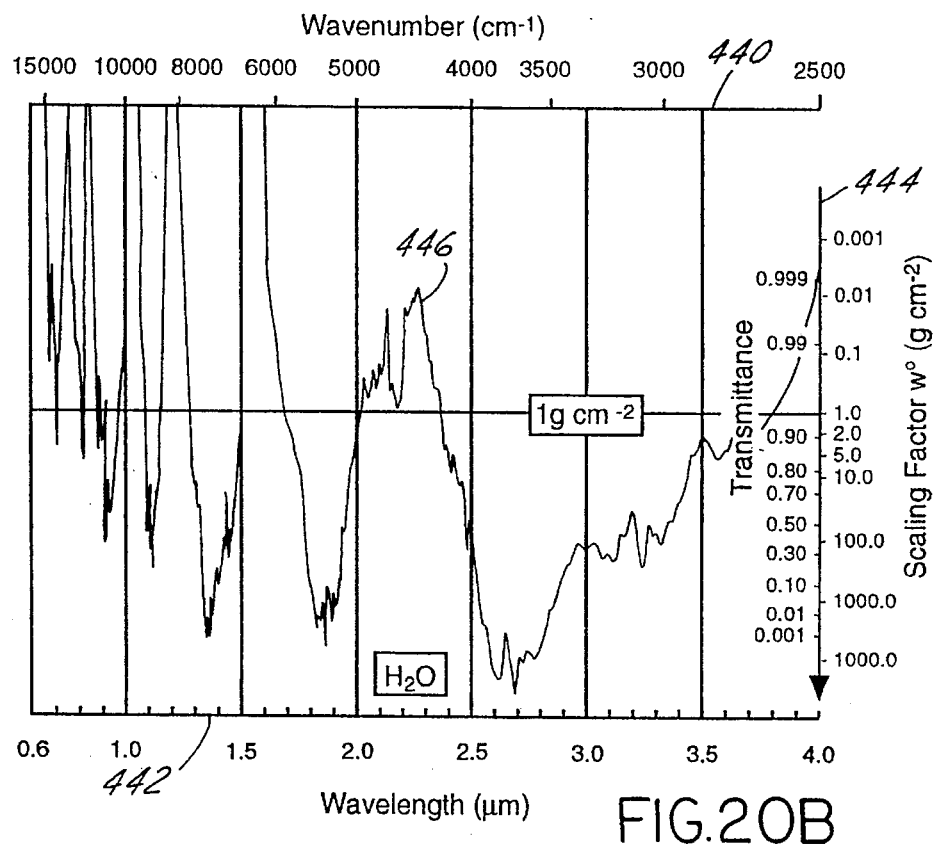
FIGS. 20B and 20C are low resolution infrared absorption spectra for water vapor.
Figure 20C:
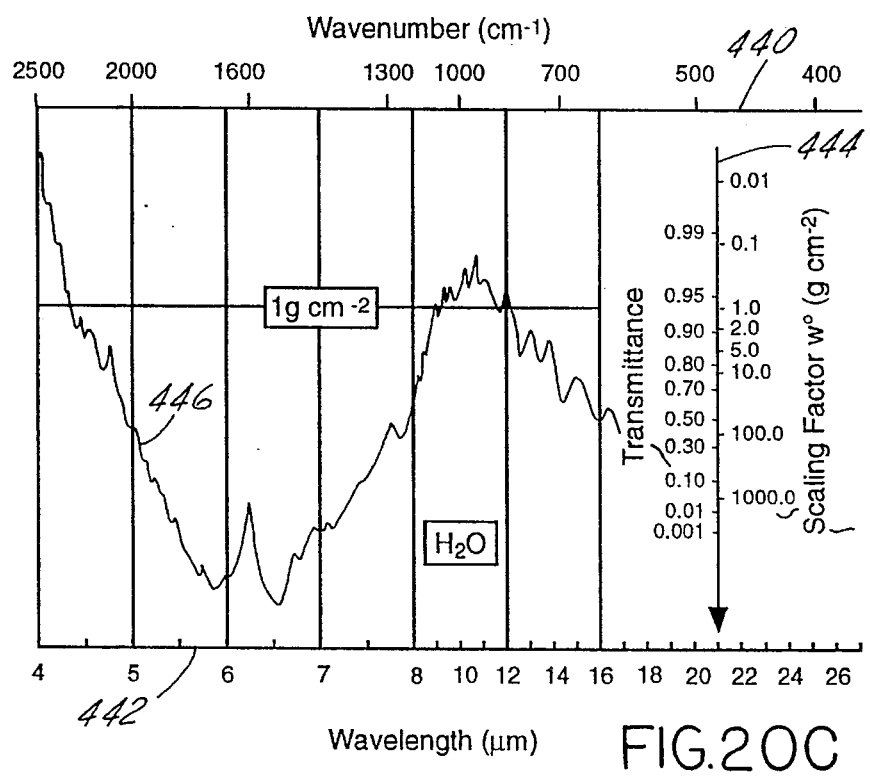

FIGS. 20B and 20C show a low resolution spectrum for water vapor. FIGS. 20B and 20C include wave number axis 440, wavelength axis 442 and transmittance scale 444. The low resolution spectrum for water vapor is shown in the curve at 446 relative to the axes Just described. The data shown in FIGS. 20B and 20C is adapted from Wolfe and Zissis, 1978.

Figure 21:
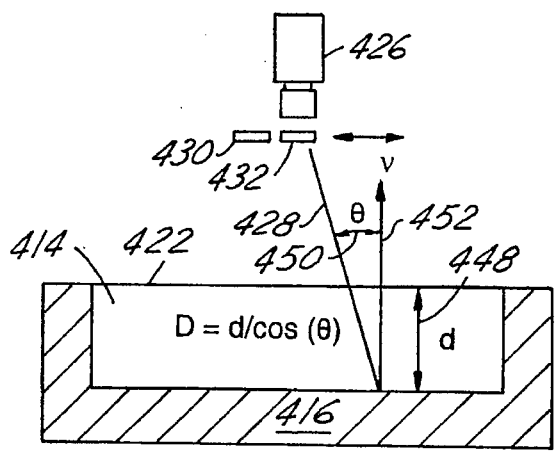
FIG. 21 is a partial sectional diagrammatic illustration of the travel of infrared radiation in the embodiment of FIG. 19.

FIG. 21 diagrammatically illustrates how the distance D between the test object surface 424 and reference surface 422 is determined within the embodiment of FIG. 19. The total distance D, traversed by the radiation through the dye 414 is described by the equation:

$$D = d/\cos(\theta) \quad (3)$$

where θ is the angle between the point measured and the normal to the reference surface corresponding to that point on the test object surface 424; and D is the distance from the particular point on test object surface 424 and a corresponding point on reference surface 422.

Distance d is obtained by solving equation 3 by knowing information about the intensity of the emitted and sensed radiation as further explained below.

Implementing the embodiment of FIG. 19 preferably includes two basic tasks for obtaining surface profile information relating to any point along test object surface 424. These two basic steps include determining the intensity of the infrared radiation emitted in the direction of image sensor 426 from a particular point on test object surface 424. Secondly, the intensity of the radiation received by image sensor 426 from that same point is determined. Determining the radiation intensity received by the camera is accomplished using a high quality infrared camera. In one embodiment, low light intensity or radiation intensity requires exposures for at least several seconds. In such an embodiment, image sensor 426 necessarily includes variable integration capability. Infrared cameras or image sensors having a variable integration capability are commercially available from several sources. Such sources include Amber Engineering, Inc. and Electrophysics Corporation. The Amber Engineering model AE-4256 has a 256×256 pixel sensor with a 12 bit direct digital output. The Amber Engineering model is especially preferred because it provides a depth resolution as great as one part in 4000, and it has a sensor sensitivity up to a wavelength of 5.5 micrometers. Electrophysics series 5400 cameras have sensitivities up to a wavelength of 20 micrometers and provide analog video RS-170 output. Image data from such cameras can be acquired to a microcomputer using a commercially available frame grabber such as from DIPIX Technologies, Inc.

The first method step described above; determining the intensity of infrared radiation emitted in the direction of image sensor 426 is preferably accomplished as diagrammatically illustrated in FIGS. 19 and 21. Optical filters 430 and 432 are utilized to obtain two images of test object surface 424 at two different wavelengths. The first image is obtained with filter 430 placed in front of the field of vision of image sensor 426. Filter 430 is chosen at a wavelength of $\lambda_1$ that has a relative transparency when compared to the dye attenuating medium 414. In effect, filter 430 renders a first image within image sensor 426 such that image sensor 426 looks through the dye as though it were not present and directly measures the radiation emitted from test object surface 424. The second image is obtained by placing filter 432, having a high absorbance at a wavelength of $\lambda_2$, in front of the field of vision of image sensor 426.

The quantitative analysis of the images sensed at the two wavelengths using filters 430 and 432 follows. The intensity at a point (x,y) on the image taken at wavelength $\lambda_1$ is described by the equation:

$$I\lambda_1(x,y) = I_o\lambda_1(x,y)\tau\lambda_{1,p}(D(x,y)) \qquad (4)$$

where $I\lambda_1(x,y)$ is the image intensity measured at point (x,y) of the sensor;

$I_o\lambda_1(x,y)$ is the intensity emitted to the sensor from the object surface; and $D(x,y)$ is the distance the infrared radiation passes through the dye.

$\tau\lambda_{1,92}(z)$ is defined as the transmittance of radiation at wavelength $\lambda_1$ through a distance z of the attenuating medium 414 having density $\rho$. The transmittance of light is the fraction of radiation transmitted with the attenuating medium 414 present.

Similarly, the intensity at each point (x,y) taken at wavelength $\lambda_2$ is described by the equation:

$$I\lambda_2(x,y) = I_o\lambda_2(x,y)(\tau\lambda_{2,p}(D(x,y)) \qquad (5).$$

Equations 4 and 5 are preferably solved for D(x,y). A method for obtaining this solution includes three preferred conditions:

(1) a transparency condition existing at $\lambda_1$ wherein $\tau\lambda_{1,p}(z)$ is approximately equal to 1;

(2) a known emittance condition wherein $(I_o\lambda_2(x,y)/I_o\lambda_1(x,y))$; and (3) calibration condition described by knowing the inverse value of $\tau\lambda_{2,p}(z)$.

The first condition including the transparency condition at $\lambda_1$ is satisfied by choosing wavelength $\lambda_1$ to be an absorption minimum such that $\lambda_{1,p}(z)$ is as close to one as possible. The transparency condition at $\lambda_1$ is described by:

$$1-\delta_1 \leq \tau\lambda_{1,p}(z) < 1 \qquad (6)$$

where $\delta_1$ is a constant that may be effectively described as:

$$\delta_1 = \max(1-\tau\lambda_{1,p}(z)),\ 0 \leq z \leq z_{max} \qquad (7)$$

where $z_{max}$ is the greatest path length through the dye to the surface of the object being gauged. The transparency condition in Equation 6 is not required, but satisfying it eliminates the need to calibrate the dye at $\lambda_1$ and obtain an explicit expression for $\tau\lambda_{1,p}(z)$. In practice, for most attenuating media 414 consisting of gases, this condition can be satisfied by having a value of $\delta_1$ being less than 0.0001 because the absorption lines of gases at standard atmospheric conditions are very narrow as illustrated in FIG. 20A.

Combining equations 4 and 6 results in:

$$I\lambda_1(x,y)/(1-\delta_1) \geq I_o\lambda_1(x,y) \geq I\lambda_1(x,y) \qquad (8)$$

or in different, more concise, notation:

$$I_o\lambda_1(x,y) = I\lambda_1(x,y)/((1-\delta_1/2) \pm \delta_1/2) \qquad (9)$$

The known emittance condition; i.e., the second preferred condition mentioned above is met if the relative emitted radiation at wavelengths $\lambda_1$ and $\lambda_2$ are known. This condition is described by the equation:

$$\{(1-\delta_2)\, R(\lambda_1,\lambda_2,T)\}\{+I_o\lambda_1(x,y)\} \leq I_o\lambda_1(x,y) \leq \qquad (10)$$
$$\{(1+\delta_2)\, R(\lambda_1,\lambda_2,T)\}\{+I_o\lambda_1(x,y)\}$$

or in different, more concise, notation:

$$I_o\lambda_2(x,y) = \{(1\pm\delta_2)R(\lambda_1,\lambda_2,T)\}\{I_o\lambda_1(x,y)\} \qquad (11)$$

where $R(\lambda_1,\lambda_2,T)$ is the ratio of emitted radiation at the two wavelengths at temperature T and $\delta_2$ is the relative error in measuring $R(\lambda_1,\lambda_2,T)$. $R(\lambda_1,\lambda_2,T)$ is obtained by calculating the intensity of radiation emitted in the direction of image sensor 426. The general expression for emitted radiation is:

$$W(\lambda,T,\epsilon,\phi)d\lambda = \epsilon(\lambda)C(\phi)F(\lambda,T)d\lambda \qquad (12)$$

where W is the emitted radiation in watts/(cm$^2$ micrometers);

$\lambda$ is the radiation wavelength in micrometers;

T is the temperature in degrees Kelvin;

$\epsilon(\lambda)$ is the emissivity (a dimensionless fraction between 0 and 1, typically about 0.2 for a machined metal);

$\phi$ is the angle the surface normal makes to the viewing direction (0 degrees for a face on view, 90 degrees for a side view);

$C(\phi)$ expresses the relationship between emittance and direction (e.g., $C(\phi)=\cos(\phi)$ from Lambert's Law); and $F(\lambda,T)$ is from Planck's Law for Black Body Radiation. $R(\lambda_1,\lambda_2,T)$ is calculated from Equation 12, yielding, $$R(\lambda_1,\lambda_2,T) = (W(\lambda_1,T,\epsilon,\phi)\Delta\lambda_1)/(W(\lambda_2,T,\epsilon,\phi)\,\Delta\lambda_2) \qquad (13)$$

where $\Delta\lambda_1$ and $\Delta\lambda_2$ are the effective bandwidths of the two filters 430, 432. Combining equations 12 and 13 yields:

$$R(\lambda_1,\lambda_2,T) = \{\epsilon(\lambda_1)C(\phi)F(\lambda_1,T)\Delta\lambda\,1\}/\{\epsilon(\lambda_2)C(\phi)F(\lambda_2,T)\Delta\lambda_2\}. \qquad (14)$$

The parameters T, $\epsilon$, and $\phi$ must not change significantly between the two images. Angle $\phi$ will be the same if the object is not moved between images; a generally preferred condition in this embodiment. The emissivity is a function of the material of the test object and therefore the ratio ($\epsilon(\lambda 1)/\epsilon(\lambda 2)$) is a constant. Typically, moreover, $\epsilon$ is a very weak function of $\lambda$ and the ratio ($\epsilon(\lambda 1)/\epsilon(\lambda 2)$) may be assumed equal to one. Dividing equation 14 by $C(\phi)$ yields:

$$R(\lambda_1,\lambda_2,T) = (\epsilon(\lambda_1)/\epsilon(\lambda_2))(F(\lambda_1,T)\Delta\lambda_1/F(\lambda_2,T)\Delta\lambda_2). \qquad (15)$$

The expression for $F(\lambda_1,T)$ is:

$$F(\lambda,T) = 2\pi hc^2/(\lambda^5(e^{hc/\lambda kT}-1)) \qquad (16)$$

where h is Planck's constant, c is the speed of light and k is the Boltzmann constant.

Figure 22:
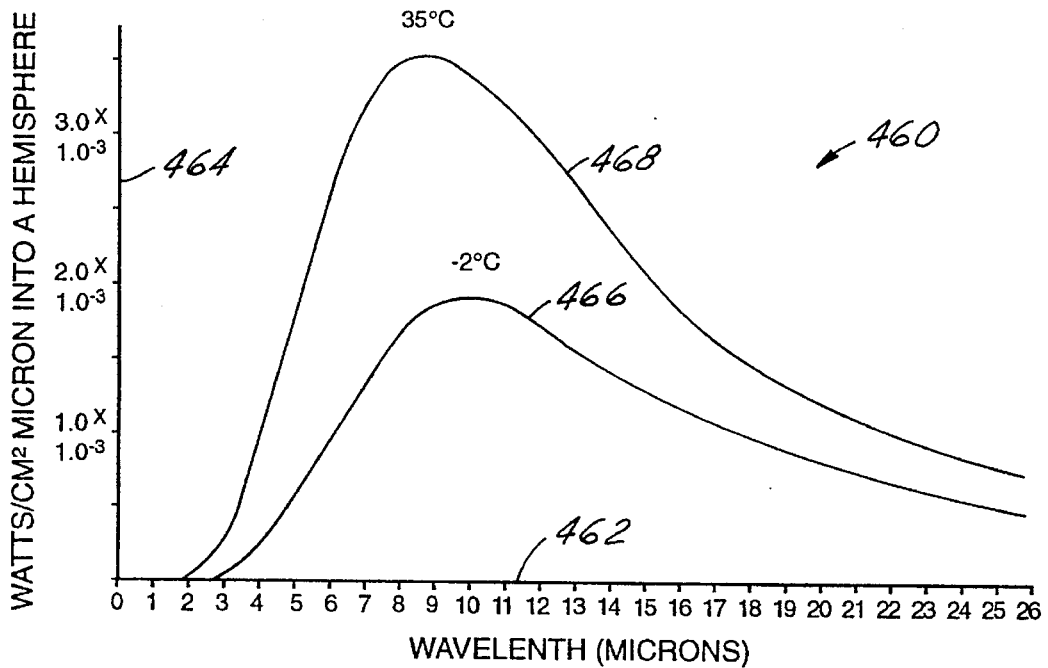
FIG. 22 is a plot of emitted radiation intensity for a test object at two temperatures.

FIG. 22 illustrates the infrared spectrum emitted from room temperature test objects having an emissivity of 1. As shown in FIG. 22, significant amounts of infrared radiation are emitted at wavelengths above 4 micrometers by objects near room temperature. At temperatures above 30° Celcius, significant infrared is emitted at a wavelength of 2 micrometers. The radiation intensity plot 460 in FIG. 22 is shown relative to the wavelength axis 462, and axis 464 which is shown in units of watts/cm$^2$micrometers. Line 466 is an intensity plot of the emitted radiation from a test object having an emissivity of 1.0 at −2° C. Line 468 is a plot for the same object at 35° C. The data illustrated in FIG. 23 is adapted from Holter, et al., 1964. FIG. 22 therefore, demonstrates the effect of temperature variation on the amount of infrared radiation emitted from a test object.

The fact that a difference in temperature causes a difference in emitted infrared radiation is one reason why the above-described method is preferred. An alternative method of determining the intensity of the infrared radiation emitted in the direction of the image sensor 426 is to obtain an infrared image of the object at a wavelength of high dye absorption without having any attenuating medium 414 present. This image would be stored as a reference image as it measures the unadulterated emitted infrared radiation. The second image is then obtained after the attenuating medium or dye 414 is injected between the test object 416 and reference surface 422. The surface 424 is then gauged by obtaining an image with the attenuating medium present and comparing that image with the first reference image obtained without any attenuating medium 414 present. This alternative method can be referred to as a single wavelength method. The single wavelength method includes the drawback of intermediately introducing an attenuating medium 414, likely changing the temperature of the object. As Just described, changing the temperature of the object will change the emitted infrared radiation between the two images and can possibly introduce undesirable error.

Substituting equation 5 into equation 15 and dividing constants results in the equation:

$$R(\lambda_1,\lambda_2,T)=\{\epsilon(\lambda_1)/(\lambda_1 5((e^{hc/\lambda_1 kT}-1)\,\Delta\lambda_1)\}/\{\epsilon(\lambda_2)/(\lambda_2 5(e^{hc/\lambda_2 kT}-1)\Delta\lambda_2)\} \quad (17)$$

$R(\lambda_1,\lambda_2,T)$ can be determined empirically, but is preferably implicitly determined in the dye calibration procedure described below. Determining $R(\lambda_1,\lambda_2,T)$ is preferred for determining the magnitude of optically generated measurement error and how such error can be controlled.

The error in determining $R(\lambda_1,\lambda_2,T)$ is $\phi_2$, defined in equation 8 or 9. The principal source of optically generated errors in this embodiment, whether in calibration or in gauging a test object surface, is temperature variation. Although temperature can be measured to accuracies of +/−0.01° Kelvin (or better) in one location, guaranteeing uniform temperature or measuring temperature accurately over an entire test object surface 424 is typically difficult. Optically generated errors are preferably reduced by choosing $\lambda_1$, $\lambda_2$ such that their values are close together as explained below. One preferred method of determining the optically generated errors in $R(\lambda_1,\lambda_2,T)$ is typified by $\epsilon(\lambda)$ being a weak function of $\lambda$ and $\Delta\lambda_1$ being equal to $\Delta\lambda_2$. For such a case, $R'(\lambda_1,\lambda_2,T)$ is described by the equation:

$$R'(\lambda_1,\lambda_2,T)=(\lambda_2 5(e^{hc/\lambda_2 kT}-1)/(\lambda_1 5(e^{hc/\lambda_1 kT}-1)).$$

Relative errors can be calculated from the equation:

$$\delta_2'=1-\{R'(\lambda,\lambda+\Delta\lambda_o,T)/R'(\lambda,\lambda+\Delta\lambda_o,T+\Delta T)\} \quad (19)$$

where $\delta_2'$ is the error given the above assumptions for $\epsilon(\lambda)$, $\Delta\lambda_1$, and $\Delta\lambda_2$. Although not explicitly stated in equation 10, 11 or 19, $\delta_2'$ is a function of $\lambda$, $\phi$, $\lambda_o$, T and $\Delta T$. The amount of optically generated error decreases as $\lambda$ and T rise. At room temperature, very high accuracy is feasible even if the temperature varies across the test object surface 424 by +/−1° C.

The third preferred condition called the calibration condition exists when the inverse of $\tau\lambda_2,\rho(z)$ is known. The inverse is defined as $\tau\lambda_2,\rho^{-1}(r)$, where r is the transmittance ratio. This inverse can be determined in one of several ways, including (1) mathematically inverting $\tau\lambda_2,\rho(z)$, (2) calculating the effective $\tau\lambda_2\rho(z)$ from measured or theoretical absorption spectra over a broad wavelength band, or (3) by tabulating $\tau\lambda_2,\rho^{-1}(r)$ from empirical measurements.

The first method, mathematically inverting $\tau\lambda_2,\rho(z)$, requires an analytic expression for $\tau\lambda_2,\rho(z)$. For example, if $\tau\lambda,\rho(z)$ obeyed Beer's law (a condition that would be true for a liquid dye) then $\tau\lambda_2,\rho(z)$ would be exponential and its inverse would be logarithmic. Such a logarithmic approach is used in the first embodiment described earlier in this application relating to diffuse surface test objects as illustrated in FIGS. 1–5. Infrared absorption by gases or attenuating media 414 that include gases follows Beer's law only over narrow wavelength bands. An analytic expression for $\tau\lambda_2,\rho(z)$ for a gas over a broad infrared band typically is difficult or impossible to find. Therefore, the logarithmic method is not preferred with the embodiment of FIG. 19.

The second method requires calculating $\tau\lambda_2,\rho(z)$ from measured or theoretical absorption spectra. It may be accomplished given the highly detailed published absorption data and absorption calculation software commercially available. One such program is available from the University of South Florida and is known as USF HITRAN PC. The program is useful for calculating calibration parameters and for selecting a proper $\lambda_1$ and $\lambda_2$.

Figure 23A:
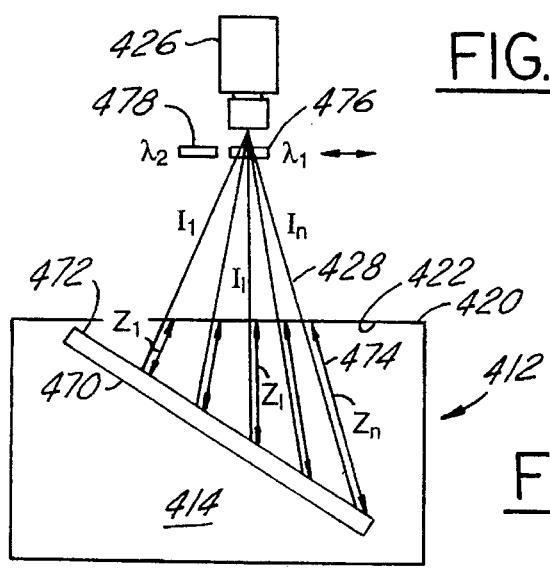
FIG. 23A is a partial diagrammatic view of a calibration set up for the embodiment of FIG. 19.

The third method, tabulating $\tau\lambda_2,\rho^{-1}(r)$ empirical measurements, preferably includes performing a dye calibration procedure illustrated diagrammatically in FIG. 23A, the description of which follows.

Figure 23B:
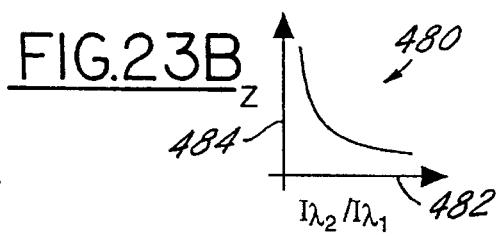
FIG. 23B is a calibration plot corresponding to the set up illustrated in FIG. 23A.

FIG. 23A shows attenuating medium 414 and calibration part 470. Calibration part 470 has a known surface geometry 472 and a known orientation relative to reference surface 422 such that distances $z_i$ indicated by the lines at 474 are known. Filters 476 and 478 are provided for taking image measurements at wavelengths $\lambda_1$ and $\lambda_2$, respectively. Filters 476 and 478 are translated into and out of the field of vision of image sensor 426 according to the direction arrow shown in FIG. 23A. The rays of infrared radiation shown at 428 corresponding to each $z_i$ 474 are received and measured by image sensor 426. These intensity values are then measured at the second wavelength $\lambda_2$. FIG. 23B illustrates a calibration plot 480 showing data that would correspond to the ratio of intensities taken at the wavelength $\lambda_2$ (i.e., with filter 478 in place) divided by the intensities of the image taken at $\lambda_1$ shown along axis 482 versus the distances $z_i$ shown on axis 484. That is, distances $z_i$ are tabulated with the ratio $R_i = I_{\lambda 2}(z_i)/I_{\lambda 1}(z_i)$ of measured intensities I.

The calibration procedure illustrated diagrammatically in FIG. 23A is preferably carried out by first preparing calibration part 470. Part 470 may be constructed of any material but must have a known contour on one surface, the calibration surface 472. For example, calibration part 470 may be a solid bar of known surface contour or a sheet of thin material stretched on a frame. The accuracy of the calibration obviously depends, in part, on the accuracy to which the contour of calibration surface 472 is known. For convenience, the calibration surface 472 is preferably flat, deviating from a plane by dimensions which are less than the desired accuracy of the optical gauging system used in accordance with the preferred embodiment of this invention. Calibration part 470 is put into an optical gauging unit that includes attenuating medium 414 at the proper concentration used for gauging test objects. Calibration part 470 is oriented such that the calibration surface faces image sensor 426 and is slanted relative to image sensor 426 such that the distances $z_i$ 474 span the range of distances reasonably anticipated to be gauged on test objects 416. Calibration part 470 is preferably brought to a uniform temperature, T. An image is acquired by image sensor 426 at $\lambda_1$ to obtain the intensity profile $I_{\lambda 1}(z_i)$. Next, an image at $\lambda_2$ is obtained by image sensor 426 to obtain the intensity profile $I_{\lambda 2}(z_i)$. The ratio $R_i$ of measured intensities is then calculated and $\tau_{\lambda 2\rho}^{-1}(r_i)$ is then tabulated from a plot of $z_i$ versus $R_i$ as illustrated in FIG. 23B. Therefore, calibration is accomplished.

Returning now to the calculation of the distance between test object surface 424 and reference surface 422, i.e., D, equations 5, 9, and 11 are duplicated here for convenience.

$$I\lambda_2(x,y) = I_o\lambda_2(x,y)(\tau\lambda 2,\rho(D(x,y))) \quad (5)$$

$$I_o\lambda_1(x,y) = I\lambda_1(x,y)/((1-\delta_1/2)\pm\delta_1/2) \quad (9)$$

$$I_o\lambda_2(x,y) = \{(1\pm\delta_2)R(\lambda_1,\lambda_2,T)\}\{I_o\lambda_1(x,y)\} \quad (11)$$

Substituting from equation 11 into equation 5 results in:

$$I\lambda_2(x,y) = \{((1\pm\delta_2)R(\lambda_1,\lambda_2,T))(I_o\lambda_1(x,y))\}T\lambda_2,\rho(D(x,y)) \quad (20)$$

Substituting equation 9 into equation 20 results in:

$$I\lambda_2(x,y) = \{((1\pm\delta_2)R(\lambda_1,\lambda_2,T))\ (I\lambda_1(x,y)/((1-\delta_1/2)\pm\delta_1/2))\}T\lambda_2,\rho(D(x,y)) \quad (21)$$

which, solved for $\tau_{\lambda 2,\rho}(D)(x,y))$ becomes:

$$\tau\lambda_2,\rho(D(x,y)) = I\lambda_2(x,y)/\{((1\pm\delta_2)R\ (\lambda_1,\lambda_2,T))((I\lambda_1(x,y)/((1-\delta_1/2)\pm\delta_1/2))\quad (22)$$

Equation 22 can be rearranged as:

$$\tau\lambda_2,\rho(D(x,y)) = \{I\lambda_2(x,y)/I\lambda_1(x,y)\}\{(1-\delta_1/2)\pm\delta_1/2)(1\pm\delta_2)R(\lambda_1,\lambda_2,T)\} \quad (23)$$

Defining $E(\lambda_1,\lambda_2,T)$ as:

$$E(\lambda_1,\lambda_2,T) = ((1-\delta_1/2)\pm\delta_1/2)(1\pm\delta_2)R\ (\lambda_1,\lambda_2,T) \quad (24)$$

and solving equation 23 for D(x,y) using the definition in Equation 24 results in:

$$D(x,y) = \tau\lambda_2,\rho^{-1}(E(\lambda_1,\lambda_2,T)(I\lambda_2\ (x,y)/I\lambda_1(x,y)) \quad (25).$$

In addition to the optically generated errors discussed in detail in reference to the previously described embodiments above in this application, the presently preferred embodiment includes further potential optically generated errors. Contributors to such optically generated errors include $\delta_1/\delta_2$ calibration errors and camera noise. An empirical example of how these factors can be contributors to optically generated errors follows.

Assume $\lambda_1$ equals 4.8 micrometers, $\lambda_2$ equals 5.8 micrometers, T equals 298 degrees K (25 degrees C.), and $\Delta T$ equals 0.1 degrees C. Assume an attenuating medium 414 being water vapor at the concentration equivalent to 0.1 mm precipital water at $Z_{max}$, the maximum depth to gauge being 0.1 mm. From FIGS. 20B and 20C, $\tau\lambda_1$ appears to be 0.999 such that equation 7 yields $\delta_1$ 0,001. Also from FIGS. 20B and 20C, the transmittance is 0.50 such that equation 19 yields $\delta_2$ at 0.00058. Using equation 18, $R(\lambda_1,\lambda_2, T)$ is 2.20, then from equation 24:

$$E(\lambda_1 = 4.8\ \mu m, \lambda_2 = 5.8\ \mu m, T = 298°\ K.) =$$
$$(1 - \delta_1/2) \pm \delta_1/2)(1 \pm \delta_2)R(\lambda_1,\lambda_2,T) =$$
$$(1 - 0.001/2) \pm 0.001/2)(1 \pm 0.00058)(2.20) = 2.20(1 \pm 0.001)$$

Therefore, variations in temperature of 0.1° C. will cause errors no greater than 0.0022 $z_{max}$, which is equivalent to an error ratio of 1 part in 454. Transmittance ranges from 1.0 to 0.50, therefore, the optical gauging system including image sensor 426 is preferably capable of a resolution of at least one part in 454 over half of its range. Therefore, it preferably has a dynamic range of at least 1:908 to ensure that its contribution to the error does not exceed that due to temperature variation. A single frame acquired by a 10-bit camera system will provide a dynamic range of 1:1024, which is sufficient.

Resolution is dependent on the absorption strength of the attenuating medium 414 and the dynamic range of image sensor 426. The upper limit of resolution can be approximated for currently available infrared camera systems at wavelengths of high absorbance according to conventional techniques or commercially available manuals accompanying proper image sensors 426 as, for example, listed previously.

Significant optically generated errors occur when wavelengths $\lambda_1$ and $\lambda_2$ are widely separated and there is a temperature variation across test object 416. A preferred method for correcting such optically generated errors is diagrammatically illustrated in FIG. 24.

Figure 24:
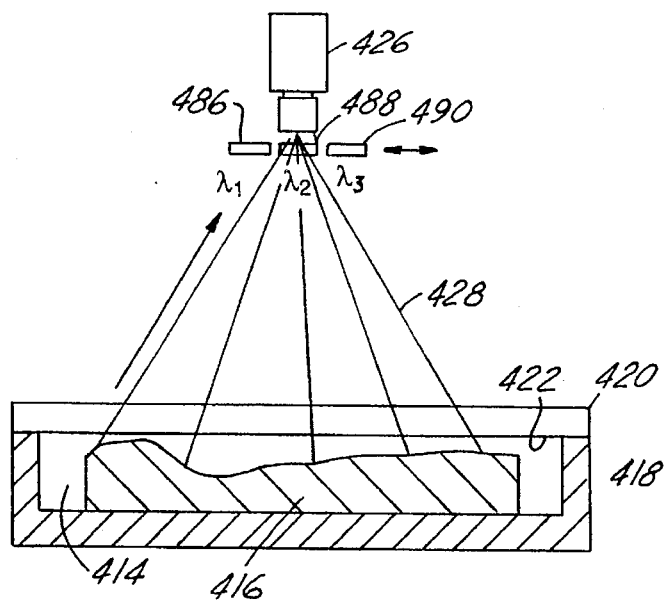
FIG. 24 is a partial sectional diagrammatic view of a means for calibrating and for correcting optically generated errors in the embodiment of FIG. 19.

FIG. 24 illustrates an optical gauging system similar to that illustrated in FIG. 19 with an addition of a third optical filter compared to the two optical filters 430 and 432 illustrated in FIG. 19. Filter 486 has a high transparency relative to the infrared radiation, filter 488 has a low transparency at a wavelength $\lambda_2$ and filter 490 has a high transparency at a wavelength $\lambda_3$ which is different from the wavelength $\lambda_1$ associated with filter 486. The emitted intensities $I_o\lambda_1(x,y)$ and $I_o\lambda_3(x,y)$ are used in equation 16 to solve for temperature. A look up table can be generated by conventional techniques if extreme speed in gauging operations is required. Equation 16 is used again to calculate $I_o\lambda_2(x,y)$, the radiation intensity emitted at $\lambda_2$.

Alternatively, a good approximation of $I_o\lambda_2(x,y)$ is possible by interpolating $I_o\lambda_1(x,y)$ and $I_o\lambda_3(x,y)$ using the equation:

$$I_o\lambda_2(x,y) = I_o\lambda_1(x,y) + R_T(I_o\lambda_1(x,y) - I_o\lambda_3(x,y)) \quad (26)$$

where $$R_T = (I_o\lambda_2(x,y) - I_o\lambda_1(x,y))/(I_o\lambda_1(x,y) - I_o\lambda_3(x,y)) \quad (27)$$

and intensities are measured at temperature T, the temperature at which optical gauging is performed. Utilization of this just described preferred three-wavelength method of correcting for optically generated errors caused, in part, by temperature variation provides gauging results that are more accurate relative to the results obtainable using the methodology and systems illustrated in FIGS. 19 and 23A.

The above described methods associated with the most recently described embodiment of this invention require that an adequate number of electrons be generated in the image sensor 426 at each pixel within the sensor array. The number of photons emitted from a black body radiator at a wavelength $\lambda$ can be calculated by dividing the total emitted energy (obtained from equation 16) by the energy per photon obtained from the following equation:

$$E_p = hc/\lambda \quad (28).$$

Assuming a 10 micrometer×10 micrometer pixel, an f8 lens, a black body emissivity of 0.1 (typical for a machined metal), a sensor quantum efficiency of 0.5, and a filter bandwidth of 10 nanometers, an image of a 300° K black body would then generate, at one pixel, 2×10$^6$ electrons per second at a wavelength of 4 micrometers and 24×10$^6$ electrons per second at 7 micrometers. At 1000° K and 4 micrometers, 4000×10$^6$ electrons per second per pixel are generated. Since a dynamic range of 1000 requires 1000$^2$= 10$^6$ electrons, adequate data can be obtained between a fraction of a second and a few seconds exposure time, depending on temperature, emissivity, optical design and sensor characteristics.

The embodiments illustrated in FIGS. 19–24 provide optical gauging systems having advantages over the inventive embodiments shown in relation to FIGS. 1–18 above. Such advantages include the capability to gauge a surface of a test object regardless of the nature of that surface. Test objects having a diffuse or specular surface or any combination of the two can be measured without modifying the apparatus, system or software of the embodiment of FIG. 19. Further, because the preferred embodiment just discussed does not require an external source of radiation, it includes the capability of measuring surfaces that are oriented relative to the image sensor up to an angle of orientation approximately 90°. This latter feature overcomes the difficulties discussed in relation to the embodiment of FIG. 8 above which is designed especially for specular surfaced object gauging.

Figure 25:
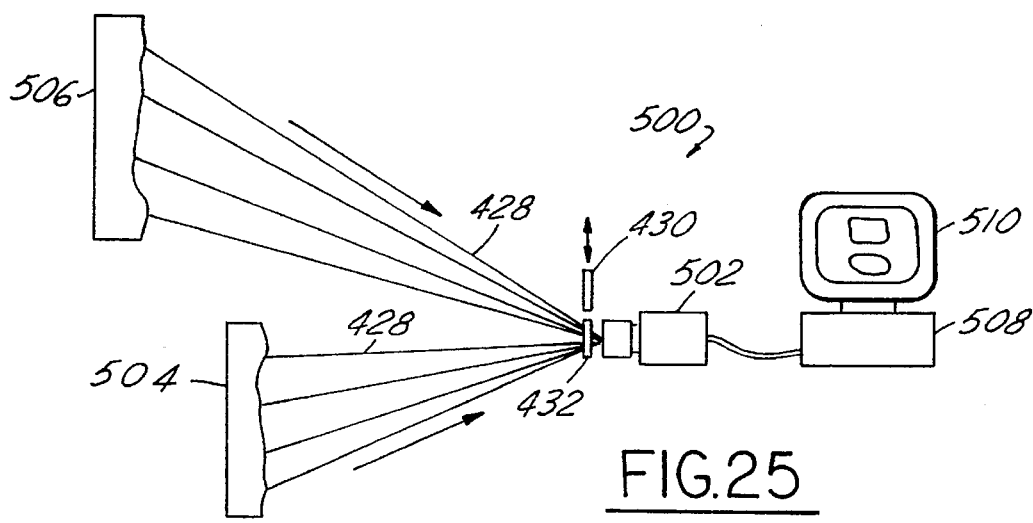
FIG. 25 is a partial sectional diagrammatic view of a preferred embodiment including a range camera.
Figure 26:
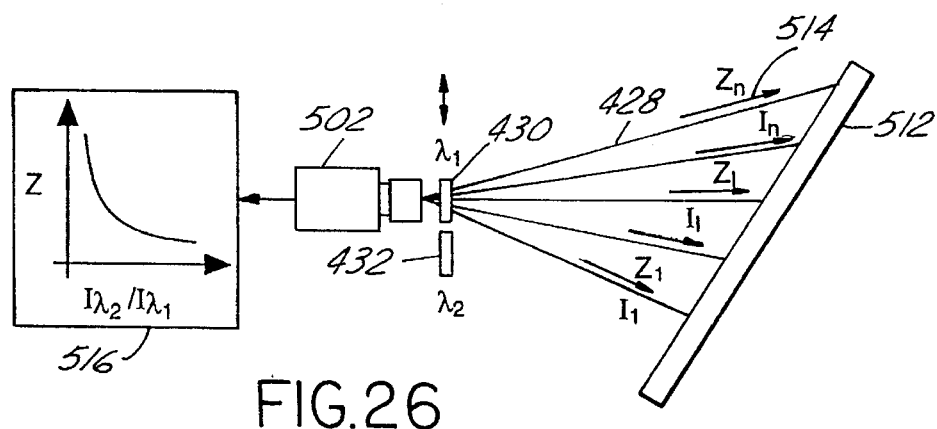
FIG. 26 is a partial diagrammatic view of a calibration set up for the embodiment of FIG. 25.
Figure 27:
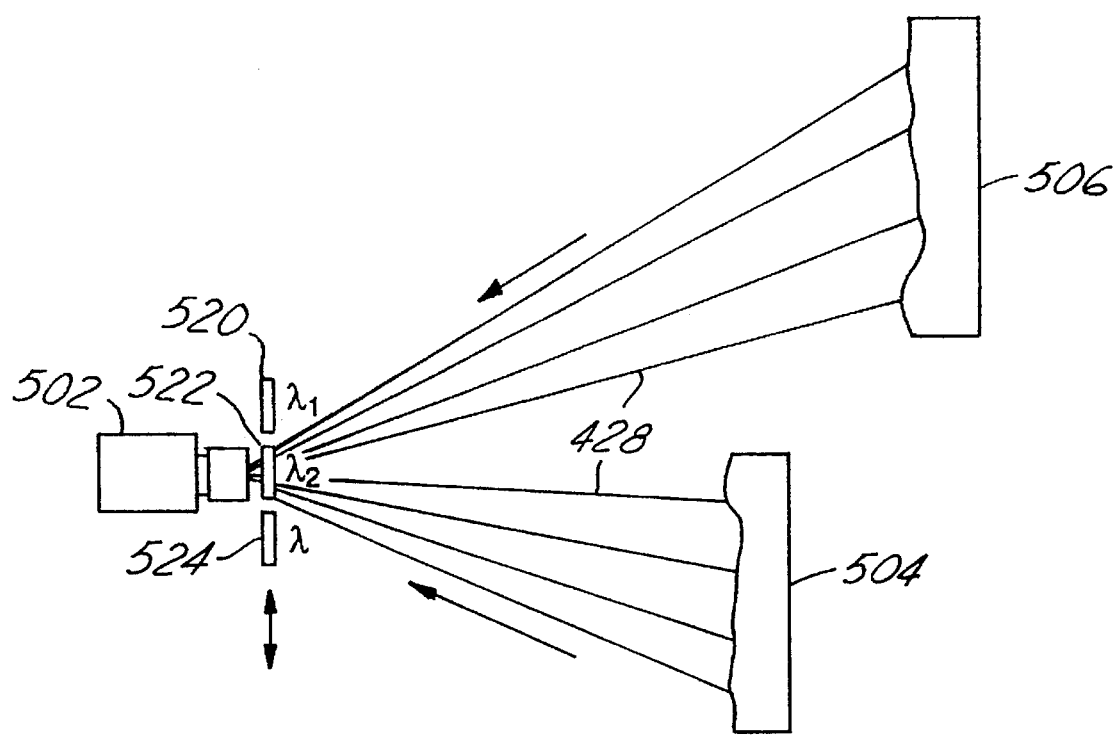
FIG. 27 is a partial diagrammatic view of a means for calibrating and correcting optically generated errors in the embodiment of FIG. 25.

Referring now to FIGS. 25–27, still another embodiment of this invention will be described. FIG. 25 shows another embodiment that incorporates a range camera as image sensor 502. Range camera 502 determines the distance to a test object surface by measuring the attenuation of infrared radiation through the intervening ambient air between test object 504 (or 506) and image sensor 502. Infrared radiation is naturally emitted by all objects, as discussed above. Atmospheric gases absorb infrared radiation to different extents at different wavelengths. Image sensor 502 measures the intensity of infrared radiation at two wavelengths; one at which the infrared radiation is weakly attenuated and a second at which the infrared radiation is strongly attenuated. The first measurement is used to determine the emittance from the object surface. Attenuation is computed by comparing the first intensity with the second intensity. The range from test object 504 and 506 to image sensor 502 is then determined using the attenuation values and a function which is dictated by calibration of the system in FIG. 25.

The optical gauging system 500 includes image sensor 502 which captures and senses the infrared radiation emitted from test objects 504 and 506 as that infrared radiation is attenuated through the intervening air. Filters 430 and 432 are utilized such that image sensor 502 receives two images of test objects 504 and 506. The infrared radiation 428 is filtered through filter 430 such that the image sensor sees the infrared radiation very weakly attenuated and then the filters are translated within the view of image sensor 502 such that filter 432 presents infrared radiation to image sensor 502 that is strongly attenuated. Image sensor 502 is coupled with computer 508 and video display device 510 such that the images received within image sensor 502 are digitized and processed in accordance with the inventive methodology such that a visually interpretable image is produced on display device 510. The function and methodology associated with optical gauging system 500 parallels that discussed in relation to the embodiment illustrated in FIGS. 19–24 with the exception of the differences noted below.

Using the embodiment illustrated in FIG. 25 requires that the same tasks and calculations that were performed in using the embodiment of FIG. 19 be accomplished. FIG. 26 illustrates a calibration set up for the system illustrated in FIG. 25. Filters 430 and 432 are translated into the field of vision of image sensor 502, in a respective manner, to vary the attenuation of the infrared radiation 428 emanated from calibration part 512 and received at image sensor 502 according to the discussion of FIG. 26 above. In this manner, the distances $z_n$ 514 are measured and plotted in a calibration plot 516 which is a graph of the ratio of intensities of infrared radiation at the respective wavelengths $\lambda 2$ (associated with filter 432) and wavelength $\lambda 1$ versus distance z 514. Otherwise the methodology used in calibrating the embodiment of FIG. 26 parallels the methodology used in calibrating the embodiment of FIG. 19.

FIG. 27 illustrates a means for correcting optically generated errors within the optical gauging system 500. FIG. 27 includes three separate filters, 520, 522, and 524, respectively. These filters are associated with three different wavelengths for varying the attenuation of infrared radiation emanating from test objects 504 and 506 and received by image sensor 502. Filters 520, 522 and 524 are strategically translated into the field of vision of image sensor 502 as desired. The methodology associated with using the means for correcting optically generated errors illustrated in FIG. 27 is preferably carried out in the same manner as that described in relation to FIGS. 19 and 24.

The embodiment of this invention illustrated in FIG. 25 has several advantages associated with it. The use of a range camera 502 eliminates the requirement that the test object be placed within a test chamber containing a controlled attenuating medium. Therefore, image sensor 502 can be used in any environment to gauge the surface of very large test objects. Similarly, the embodiment illustrated in FIG. 25 could be used outdoors. The embodiment of FIG. 25 is adaptable to gauging objects having diffuse, specular or a mixture of surfaces. Therefore, a variety of test objects can be gauged or measured without modifying the apparatus or software associated with the embodiment of FIG. 25. The embodiment of FIG. 25 is capable of measuring various surfaces, in part, because no external source of radiation is required and therefore no correction for varying reflectivity is involved. Similarly, because no external source of radiation is required the embodiment of FIG. 25 can measure surfaces oriented at angles of approximately 90° relative to image sensor 502. Lastly, the embodiment of FIG. 25 includes a passive instrument and therefore can determine range without detection. Determining the range to a test object and gauging its surface without detection may be advantageous in military operations, for example.

Referring now to FIGS. 28 through 35, presently preferred methods for correcting optically generated errors associated with this invention will be described. The optically generated errors associated with the embodiments illustrated by FIGS. 1–18 above that are addressed by the presently preferred methods of correcting such errors can be classified within five general categories.

First, optically generated errors can result from problems associated with the placement of filters in the path of the radiation that travels between the source of radiation and the image sensor in the optical gauging system. In one embodiment, the filters must be placed at or adjacent to the lens on the image sensor. Placing filters adjacent to the source of radiation introduces variation in illumination or irradiation intensity between the different images created because of the different filters and such variations are undesirable. Such variations are erroneously interpreted as test object profile variations when determining the actual image or corrected image of the test object surface. However, placing the filters at the lens introduces other problems. Problems with placing the filters adjacent the lens on the image sensor include introducing undesirable vibration to the image sensor during a filter change or translation and adding additional bulk to the configuration of the system which limits the placement of the image sensor and, moreover, creates a registration problem.

Second, the registration problem, just mentioned, occurs when two filters are used to correct optically generated errors in the image of the test object surface. Two images must be registered at different wavelengths to an accuracy on the order of a fraction of the interpixel distance, wherein the pixels are defined, in part, by the image sensor. Each point in each image must correspond to the same point on the test object or incorrect data is introduced into the image subtraction that is utilized in forming a corrected image which results in an erroneous value or values within the corrected image. Unfortunately, standard glass filters do not have the quality necessary (i.e., their faces are not near enough to parallel) and will therefore cause an image shift of several pixels within an image when placed adjacent the image sensor lens. Filters having adequate quality are prohibitively expensive. The alternative of placing the filters adjacent the source of radiation eliminates the problems associated with having the filters adjacent the lens of the image sensor, however the problems described in the previous paragraph are then introduced.

Third, variations in color (hue and saturation) across the surface of the test object cause errors in the calculation of the distance between the test object and the reference surface, therefore resulting in errors in the image of the test object surface. Variations in color across the surface of the test object effectively filter portions of the radiation received by the image sensor and, therefore, the test object surface participates in the filtering process in an undesirable fashion.

Fourth, problems can be caused by inadequate illumination of certain portions of the test object surface. While the optical gauging system 100 is insensitive to variations in surface reflectivity for illumination, these variations are often comparable in magnitude to the dynamic range of the image sensor. The resolution of the system is therefore reduced because the illumination must be adjusted to avoid saturation and blooming, thereby requiring the image sensor to acquire data over inadequately illuminated areas on the test object surface.

Fifth, some test object surfaces introduce what is called a dynamic range problem. A test object surface having a large depression, for example, is difficult for optical gauging system 100 to accurately and correctly gauge. The optical gauging system, as described above in relation to FIGS. 1–18 is limited to a depth resolution of $(d_{max}-d_{min})/g$, where $d_{max}$ is the maximum depth of a depression on the test object surface and $d_{min}$ is the minimum depth of such a depression and where g is the number of gray levels of the image sensor (e.g., 256 for an 8-bit camera). Higher resolution requirements demand higher image sensor performance. Such requirements may exceed the capabilities of commercially available image sensors or cameras and, at times, may require the use of undesirably expensive image sensors.

Figure 28:
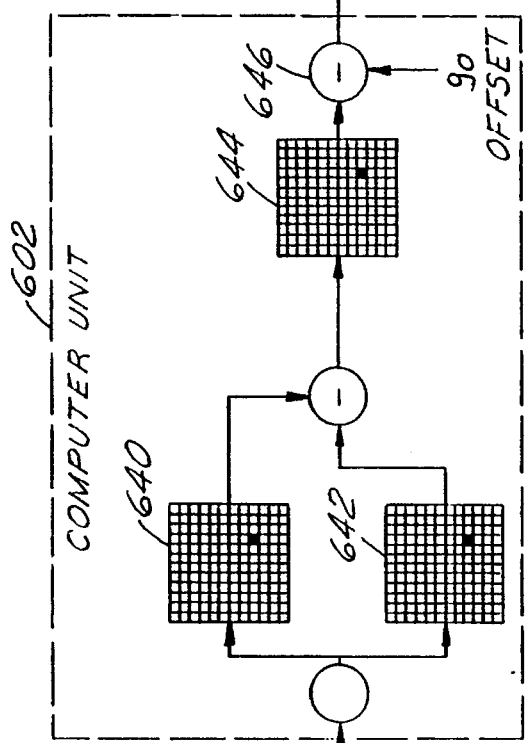
FIG. 28 is a partial diagrammatic view of a optical gauging system designed in accordance with this invention.

The presently preferred methods of correcting such optically generated errors address these five general problems. FIG. 28 illustrates optical gauging system 100 as theoretically divided into three basic units; camera unit 600, computer unit 602 and output unit 604. Camera unit 600 includes the test surface 612 on test object 614, master surface 616 which defines reference surface 618 and attenuating medium 624 which is provided between reference surface 618 and test surface 612. Filter 626 and 628 are used to attenuate the radiation reflected from test surface 612 according to the description above in relation to the embodiments illustrated by FIGS. 1–18. Radiation source 632 is provided to irradiate test surface 612 such that image sensor 634 receives radiation reflected from test surface 612 to thereby form an image of the test object surface.

Computer unit 602 utilizes computer software and conventional computer hardware to generate an image which represents the distance between the test object surface 612 and reference surface 618 by taking information from image sensor 634 and converting that into a digitized image of test surface 612. The calculation of the distance between test surface 612 and reference surface 618 across the image of test object 614 begins by taking the logarithm of the intensity data received from the image sensor by the computer unit 602. The information or intensity data received as taken through filter 626 is stored in image 640. Similarly, the intensity data received from image sensor 634 as received through filter 628 is stored in image 642. Image 640 is then subtracted from image 642 modulo g pixel-by-pixel from image 642 yielding image 644. "g" in "modulo g" represents the number of gray levels, for example 256 for an eight-bit data. Offset value $g_0$ is then subtracted from image 644 at 646. Typically, $g_0$, which establishes the reference point, is the gray level in image 644 of either the highest or lowest point on test object surface 612. In this instance, again, subtraction is performed modulo-g. The result is a digitized image which, when multiplied by a constant determined by calibration (as generally described above) describes the distance between the test object surface 612 and reference surface 618.

Output unit 604 demonstrates diagrammatically three potential means for outputting the corrected image of test surface 612. The three means illustrated include display terminal 650, computer printout 652 and computer memory 654. It is to be understood that the corrected image of test surface 612 could be displayed or interpreted in a variety of conventional manners each of which would fall within the scope of this invention.

Figure 29:
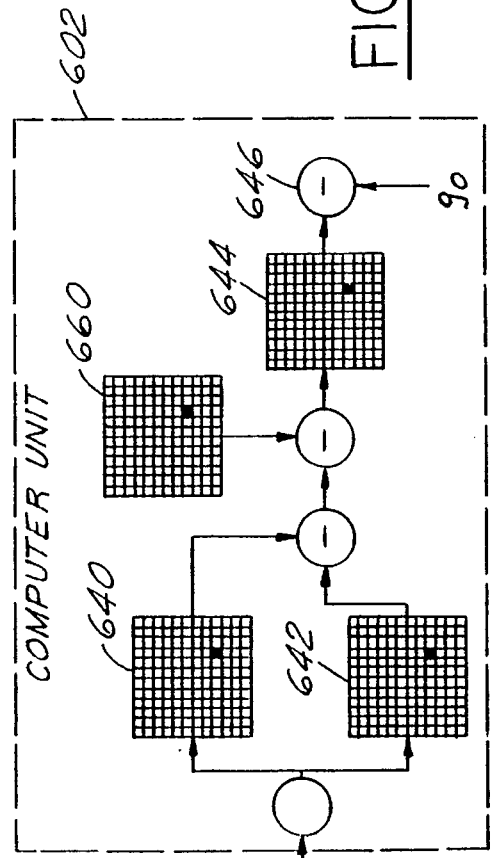
FIG. 29 is a partial diagrammatic view of a means for creating a bias image that is used for correcting optically generated errors in an image produced by an optical gauging system designed in accordance with the teachings of this invention.

FIG. 29 illustrates the inventive methodology for correcting the errors introduced by the filter placement problem described above. The error correction illustrated within FIG. 29 is also useful for correcting the registration problem and the problems associated with the test object coloring also described above. In FIG. 29, it is important to note that filters 626 and 628, respectively, are placed adjacent radiation source 632 one at a time. Computer unit 602 now includes bias image 660 which is subtracted from the difference between images 642 and 640 in order to generate a corrected image 644. The function of bias image 660 is to store compensation or correction data needed to correct for differences between the illumination intensity pattern of images 640 and 642, respectively.

Bias image 660 can be constructed in several ways depending on whether it is needed for correction of filter nonuniformity, correction of reference surface error, or comparison of a test object with a master object having a known surface contour.

Figure 30:
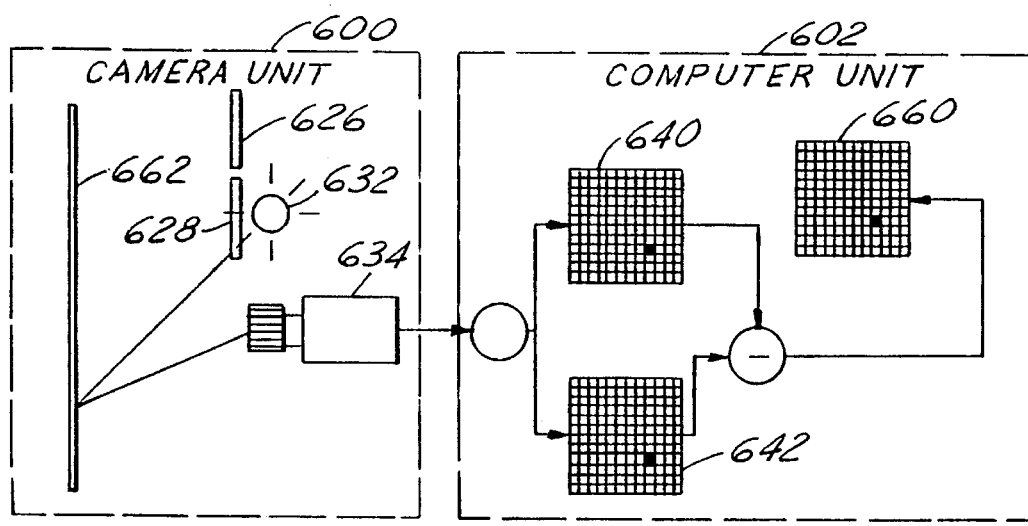
FIG. 30 is a partial diagrammatic view of another means for creating a bias image for correcting optically generated errors.

When bias image 660 is created to correct for filter nonuniformity, the configuration illustrated in FIG. 30 is used. Uniformly colored surface 662 is gauged using image sensor 634 with filter 626 and 628 placed, respectively, adjacent radiation source 632. Uniformly colored surface 662 could be, for example, a white piece of cardboard. Uniformly colored surface 662 preferably has uniform spectral reflectivity. Uniformity of reflectance is not critical, but the spectral reflectivity (color saturation and hue) must be uniform. In practice, such conditions are relatively easy to achieve. In the set up illustrated in FIG. 30, for example, uniform spectral reflectivity is achieved by placing surface 662 on top of the master surface 616 as illustrated in FIG. 28. Bias image 660 is generated and calculated in the embodiment of FIG. 30 as the difference between image 642 and 640.

Figure 31:
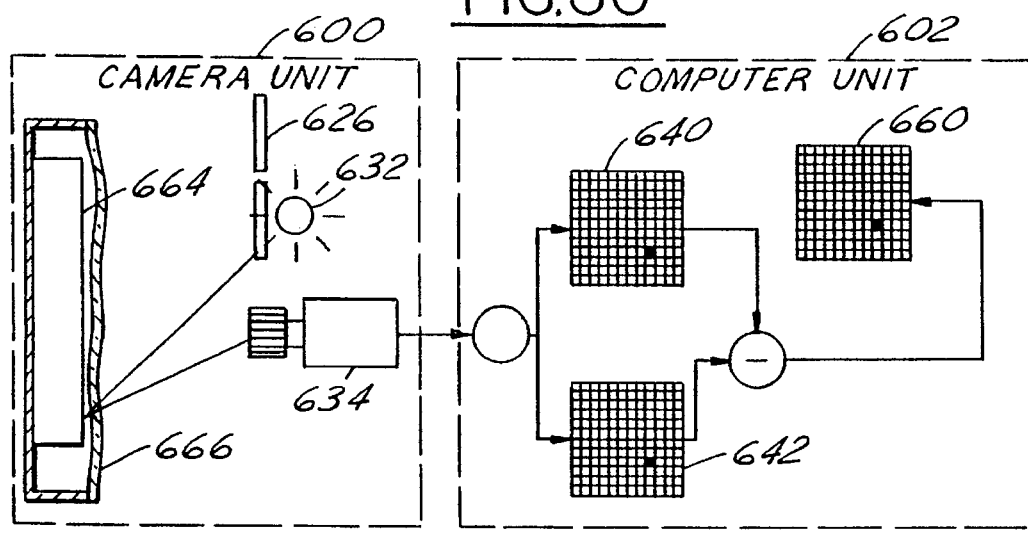
FIG. 31 is a partial diagrammatic view of still another means for correcting optically generated errors.
Figure 32:
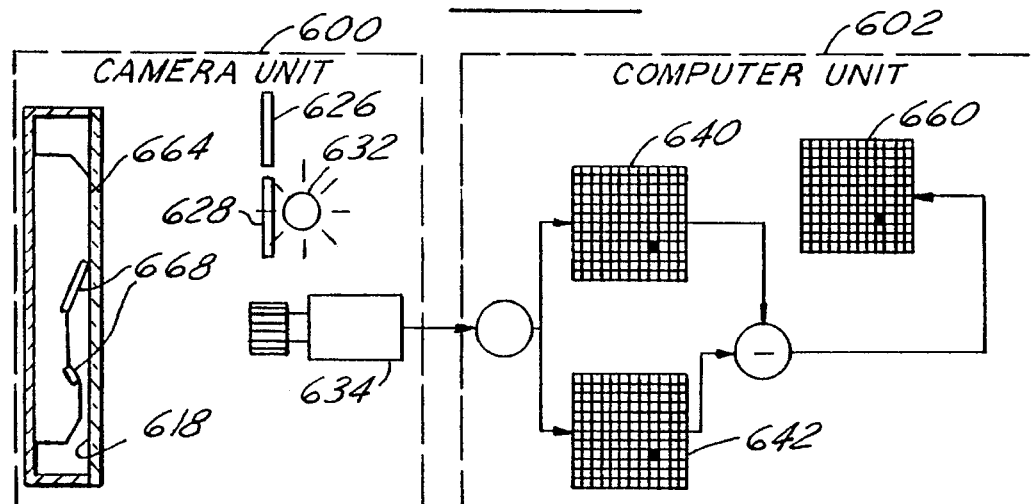
FIG. 32 is a partial diagrammatic view of yet another means for creating a bias image for correcting optically generated errors.

FIG. 31 is an embodiment for creating bias image 660 that is useful to correct for deviations within reference surface 618 in such scenarios as when reference surface 618 may have become scratched or damaged or was improperly manufactured such that it deviates from a desired nominal profile. Creating bias image 660 as illustrated in FIG. 31 further allows less expensive glass master surfaces to be used to provide a reference surface 618. Bias image 660 as illustrated in FIG. 32 is obtained by providing a calibration surface 664 having the desired nominal profile (in a typical scenario a flat profile) and gauging that calibration surface 664 using the attenuating medium concentration at which test objects will be gauged. Bias image 660 in this embodiment is the difference between images 642 and 640. Bias image 660 created as illustrated in FIG. 31 is also useful for correcting optically generated errors introduced by filter nonuniformity.

FIG. 32 illustrates yet another method of generating bias image 660. Bias image 660 as illustrated in FIG. 32 is used for automatic comparison of a gauged test object 614 with a nominal master object 667. Master object 667 is gauged as illustrated in FIG. 32 and bias image 660 is the difference between the images 642 and 640. If a gauged test object 614 varies in color such that it potentially introduces or creates the test object color problem described above, bias image 660, as generated in FIG. 32, will correct for the optically generated errors introduced by the test object color variations where master test object 667 contains similar or the same color variations 668 as a typical test object 614 will contain. Bias image 660, as created in FIG. 32, also corrects for optically generated errors resulting from filter nonuniformity and reference surface error. When a test object 614 is gauged using bias image 660, generated in accordance with the teachings of FIG. 32, image 644 represents the difference between the master object 667 and the test object surface 612 instead of the distance between test object surface 612 and reference surface 618.

Still another method of correcting optically generated errors within the optical gauging system associated with this invention includes selectively varying the amount of radiation incident on test object surface 612, for example by using masks. Creation of a bias image as described above allows optically generated errors associated with the inadequate illumination and dynamic range problems described above to be corrected when using a mask in accordance with this invention.

Figure 33:
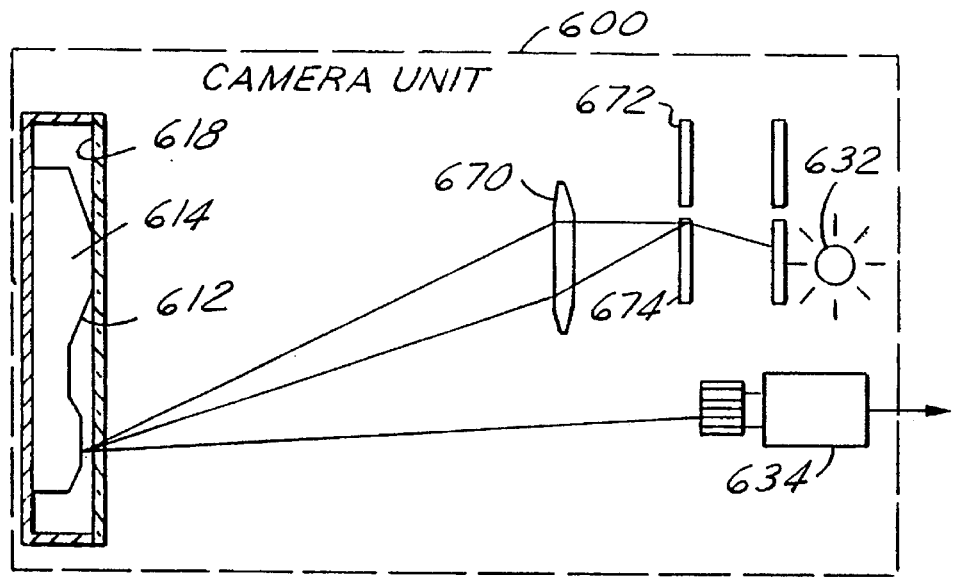
FIG. 33 is a partial diagrammatic view of a means for selectively varying the amount of radiation that irradiates a test object to thereby correct optically generated errors in an image of the test object surface profile.

FIG. 33 diagrammatically illustrates the method of using a mask within camera unit 600. In FIG. 33, camera unit 600 includes projection lens 670, masks 672 and 674 and filters 626 and 628 all within the pathway of radiation emanating from radiation source 632 toward test surface 612. In this embodiment test object 614 is irradiated using a projection system which mimics a conventional slide projector wherein masks 672 and 674 are similar to photographic slides. Masks 672 and 674 are created to be essentially the negative of the image received by image sensor 634. The function of masks 672 and 674 is illustrated diagrammatically in FIGS. 34A–34C.

Figure 34A:
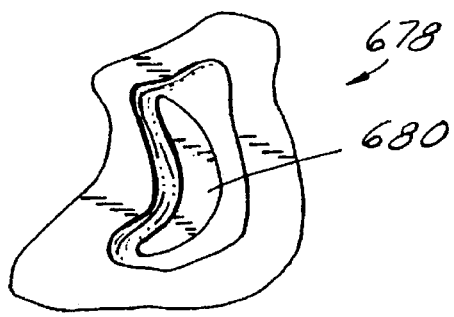
FIGS. 34A–34C diagrammatically represent the affects of mask on the image produced of the test object surface of the embodiment illustrated in FIG. 33.
Figure 34B:
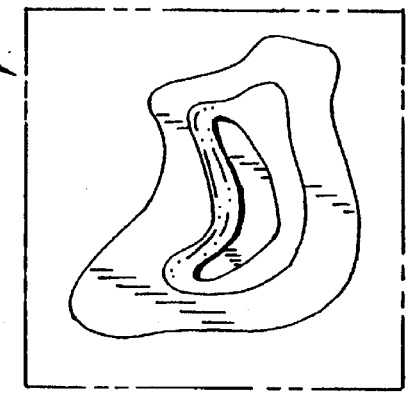

The image in FIG. 34A represents the image of test surface 612 received by image sensor 634 when test object 614 is irradiated without a mask in the pathway of radiation. Image 678 in FIG. 34A includes a deep hole 680 in the approximate center of test object 614 which is totally illuminated because of the high absorbance of the radiation by attenuating medium 624 due to the distance that the radiation travels through that medium. Image sensor 634 is unable to obtain an accurate intensity reading of the area corresponding to hole 680 because the intensity of the radiation reflected from that portion of test surface 612 is too low for an accurate reading. Scenarios may exist wherein a hole 680 is so deep that no reading is possible depending on the limits of image sensor 634. Image 678' in FIG. 34B represents mask 674 used when radiating the test object 614 and is essentially the negative of the image 678 in FIG. 34A.

Figure 34C:
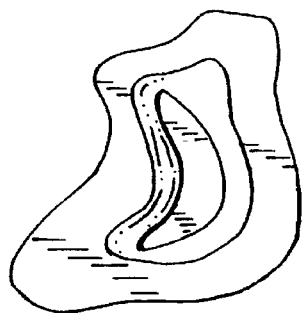

FIG. 34C shows the result of irradiating the test object 614 with mask 674 in place as illustrated in FIG. 33. The resultant image 678" (FIG. 34C) is most evenly illuminated, thereby allowing the exposures of image sensor 634 to be lengthened in time. Therefore, relatively more accurate depth readings are achieved. In the embodiment illustrated in FIG. 33, each filter has a corresponding mask; mask 672 corresponds to filter 626 and mask 674 corresponds to filter 628.

When utilizing masks 672 and 674 a bias image 660 must be used. Bias image 660 is constructed using one of the methods described above. It is important to note that precise registration of the mask with the test object 614 is not necessary because bias image 660 compensates for illumination variation differences between images.

The masks used in accordance with this invention may be a conventional slide created photographically or by a transparent liquid crystal display controlled by the computer associated with optical gauging system 100. The use of a photographic negative type mask increases the dynamic range of optical gauging system 100 by a factor of up to 1,000 (the dynamic range of photographic plates and film). In another embodiment (not particularly illustrated) the amount of radiation incident on test object 614 is selectively varied by placing an obstruction in the radiation path between radiation source 634 and test object 614. In such an embodiment, a projection lens 670 is not required.

Figure 35:
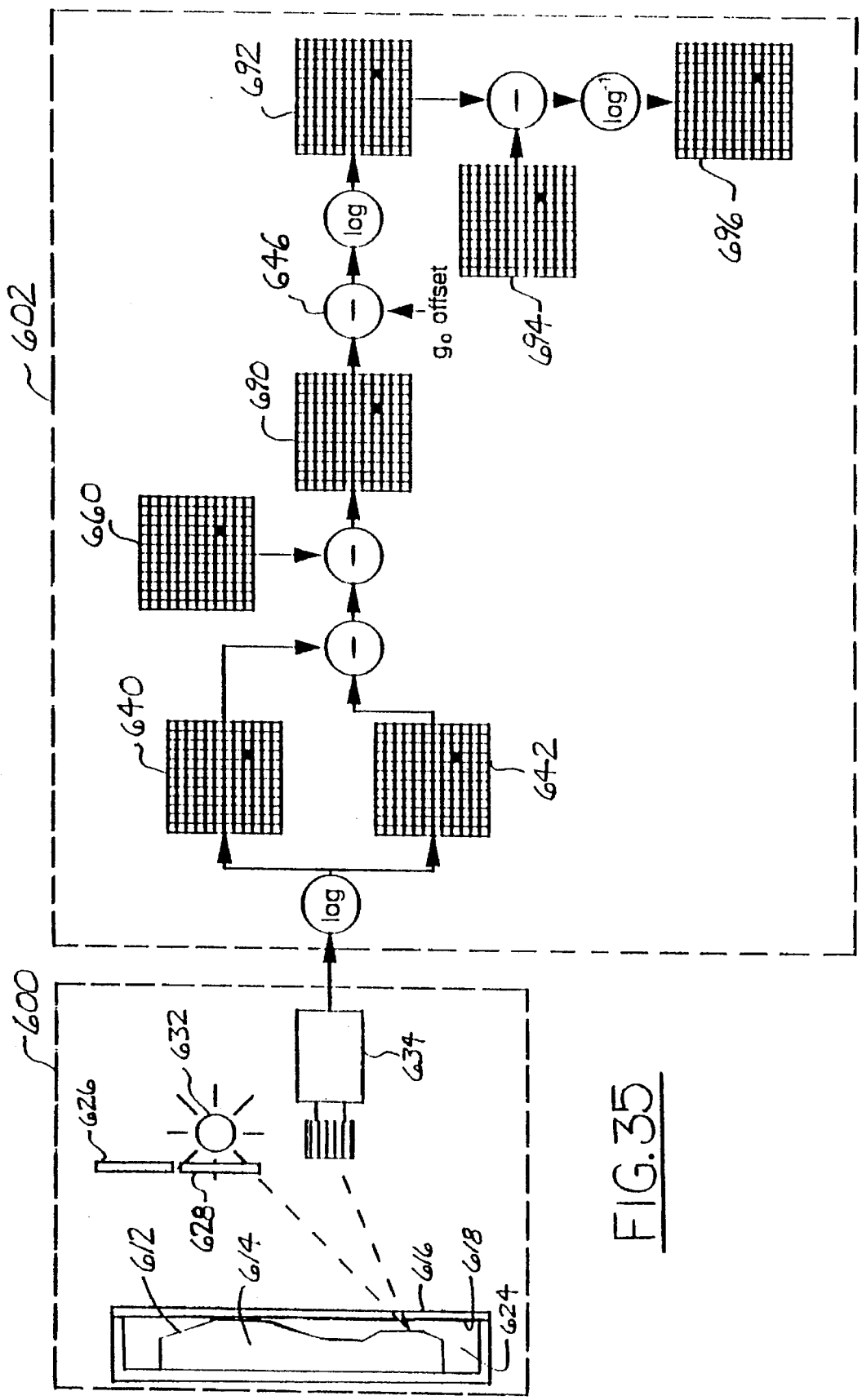
FIG. 35 diagramatically illustrates a method for correcting optically generated errors caused by oblique distortion.

FIG. 35 diagrammatically illustrates still another method for correcting optically generated errors associated with this invention. FIG. 35 diagrammatically illustrates a method for correcting optically generated errors that result from oblique distortion caused by the spacial orientation between image sensor 634 and test object 614.

FIG. 35 illustrates another preferred method of correcting optically generated errors that are associated with any of the embodiments previously described. The methodology diagrammatically illustrated in FIG. 35 is useful for correcting optically generated errors that are caused by oblique distortion. As one skilled in the art will appreciate, the further to the outer limits of the image sensor field of vision that a test object surface extends necessarily includes a longer pathway that the radiation must travel to get from the test object surface to the image sensor. For example, in FIG. 35 the points on test object 614 that are to the extreme top and bottom (according to the drawing) of the test object will necessarily involve a longer pathway the radiation must travel from source 632 to reflect from test surface 612 and be received by image sensor 634. The longer travel through the attenuating medium provides false or inaccurate intensity data to image sensor 634 thereby rendering an oblique distortion optically generated error in the image of test surface 612.

In FIG. 35 computer unit 602 includes the means for correcting optically generated errors due to oblique distortion. Image 640 is generated by gauging test object 614 with filter 626 in place and image 642 is similarly generated by gauging test object 614 with filter 628 properly in place in accordance with the general description above. Bias image 660 is created in one of the manners described above. Image 642 is subtracted from image 640 and image 660 is subtracted from that difference. The arithmetic difference gives the resulting image 690. Offset value $g_0$ is subtracted at 646. The logarithm of the image 690 minus the $g_0$ offset is then calculated in order to produce image 692.

Distortion image 694 is subtracted from image 692. Distortion image 694 is preferably produced in the following general manner. First, a calibration part having a known calibration surface such as 664 illustrated in FIG. 31 is placed where test object 614 will be placed in order to be gauged. Calibration surface 664 preferably has equal spacing across its entire surface between surface 664 and reference surface 618. Calibration surface 664 is then gauged in accordance with the general methodology described above. The resulting image will include distortion errors due to the oblique distortion near the edges of calibration surface 664. That is, the edges of calibration surface 664 will appear within the uncorrected image as being farther away from reference surface 618 than the portions of surface 664 that are in the center of the image sensor field of vision, for example. This information is used to create distortion image 694. Specifically, calibration surface 664 is preferably gauged using filters 626 and 628 respectively, thereby producing image 640 and 642 and the distortion image 694 is produced by taking the logarithm of the arithmetic difference between images 640 and 642.

Distortion image 694 is subtracted from image 692 and the inverse logarithm is taken of the difference between images 692 and 694 to thereby produce corrected image 696. Corrected image 696 has all effects of oblique distortion removed and, therefore, provides a correct image of the surface 612 on test object 614.

The preceding description is exemplary rather than limiting in nature. Modifications and variations are possible that do not depart from the spirit and purview of this invention. The scope of this invention is limited only by the following claims.

What is claimed is:

1. A method of correcting optically generated errors in an image of a test object surface profile, the image being formed by irradating the test object, attenuating radiation reflected from the test object and determining the intensity of the radiation across the surface to thereby form the image, comprising the steps of:

(A) filtering the radiation used to irradiate the test object before such radiation irradiates the test object; and (B) forming a bias image of the test object surface profile, by performing the substeps of:

forming a first image of a preselected calibration surface at a first wavelength;

forming a second image of the calibration surface at a second wavelength;

digitizing the first and second images, respectfully; and forming the bias image by subtracting the first digitized image from the second digitized image, whereby the bias image is used to correct optically generated errors caused by undesirable imperfections in a reference surface used to determine the test object surface profile as a function of the spacing between the test object surface and the reference surface.

2. A method of correcting optically generated errors in an image of a test object surface profile, the image being formed by irradiating the test object, attenuating radiation reflected from the test object and determining the intensity of the radiation across the surface to thereby form the image, comprising the steps of:

(A) filtering the radiation used to irradiate the test object before such radiation irradiates the test object; and (B) forming a bias image of the test object surface profile, by performing the substeps of:

forming a first image at a first wavelength of a calibration object having a preselected surface profile and essentially the same reflectance across the surface as the reflectance across the test object surface;

forming a second image of the calibration object at a second wavelength;

digitizing the first and second images, respectfully; and forming the bias image by subtracting the first digitized image from the second digitized image, whereby the bias image is used to correct optically generated errors caused by nonuniform reflectance across the test object surface.

* * * * *

UNITED STATES PATENT AND TRADEMARK OFFICE
CERTIFICATE OF CORRECTION

PATENT NO. : 5,517,575
DATED : May 14, 1996
INVENTOR(S) : Theodore B. Ladewski

It is certified that error appears in the above-indentified patent and that said Letters Patent is hereby corrected as shown below:

Column 35, line 33, please delete "irradating" and insert --irradiating-- in its place.

Signed and Sealed this

Twenty-fourth Day of September, 1996

Attest:

BRUCE LEHMAN

Attesting Officer     Commissioner of Patents and Trademarks